United States Patent
Liu et al.

(10) Patent No.: US 11,755,798 B2
(45) Date of Patent: Sep. 12, 2023

(54) LOGIC CIRCUITS WITH REDUCED TRANSISTOR COUNTS

(71) Applicant: TAIWAN SEMICONDUCTOR MANUFACTURING COMPANY, LTD., Hsinchu (TW)

(72) Inventors: Chi-Lin Liu, Hsinchu (TW); Jerry Chang-Jui Kao, Hsinchu (TW); Wei-Hsiang Ma, Hsinchu (TW); Lee-Chung Lu, Hsinchu (TW); Fong-Yuan Chang, Hsinchu (TW); Sheng-Hsiung Chen, Hsinchu (TW); Shang-Chih Hsieh, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 46 days.

(21) Appl. No.: 17/340,662

(22) Filed: Jun. 7, 2021

(65) Prior Publication Data
US 2021/0294958 A1 Sep. 23, 2021

Related U.S. Application Data

(63) Continuation of application No. 15/930,010, filed on May 12, 2020, now Pat. No. 11,030,366, which is a
(Continued)

(51) Int. Cl.
*G06F 30/327* (2020.01)
*G06F 111/06* (2020.01)
*G06F 119/18* (2020.01)

(52) U.S. Cl.
CPC ........ *G06F 30/327* (2020.01); *G06F 2111/06* (2020.01); *G06F 2119/18* (2020.01)

(58) Field of Classification Search
USPC ........................................................ 716/104
See application file for complete search history.

(56) References Cited

U.S. PATENT DOCUMENTS 4,701,860 A * 10/1987 Mader ................ H03K 19/1731
438/129
5,003,478 A 3/1991 Kobayashi et al.
(Continued)

FOREIGN PATENT DOCUMENTS

| CN | 103034758 | 4/2013 |
| CN | 106339532 | 1/2017 |
| TW | 200541011 | 12/2005 |

OTHER PUBLICATIONS

Office Action dated May 23, 2019 from corresponding application No. TW 107117100.

*Primary Examiner* — Mohammed Alam
(74) *Attorney, Agent, or Firm* — Hauptman Ham, LLP

(57) ABSTRACT

A logic circuit including first and second inverters, first and second NAND circuits, a transmission gate, and a transmission-gate-substitute (TGS) circuit, and wherein: for each of the first and second NAND circuits, a first input is configured to receive corresponding first and second data signals, and a second input is configured to receive an enable signal; the first inverter is configured to receive an output of the first NAND circuit; the transmission gate and the TGS circuit are arranged as a combination circuit which is configured to receive an output of the second NAND circuit as a data input, and outputs of the first inverter and the second NAND circuit as control inputs; the second inverter is configured to receive an output of the combination circuit; and an output of the second inverter represents one of an enable XOR (EXOR) function or an enable XNR (EXNR) function.

20 Claims, 23 Drawing Sheets

Related U.S. Application Data continuation of application No. 15/936,712, filed on Mar. 27, 2018, now Pat. No. 10,664,565.

(60) Provisional application No. 62/509,048, filed on May 19, 2017.

(56) References Cited

U.S. PATENT DOCUMENTS

| | | | |
|---|---|---|---|
| 5,369,645 A | 11/1994 | Pritchard et al. | |
| 5,459,673 A * | 10/1995 | Carmean | G06F 30/327 716/113 |
| 5,586,047 A * | 12/1996 | Imahashi | G06F 30/39 716/124 |
| 6,380,764 B1 * | 4/2002 | Katoh | H03K 19/0013 326/112 |
| 6,490,715 B1 * | 12/2002 | Moriwaki | G06F 30/33 716/108 |
| 6,636,076 B2 | 10/2003 | Whetsel | |
| 6,963,225 B2 | 11/2005 | Whetsel | |
| 7,260,442 B2 | 8/2007 | Hwang et al. | |
| 8,302,057 B2 * | 10/2012 | Saika | H01L 27/0207 716/134 |
| 9,256,709 B2 * | 2/2016 | Yu | G03F 1/36 |
| 9,292,644 B2 * | 3/2016 | Loh | G06F 30/39 |
| 9,584,099 B2 | 2/2017 | Liu et al. | |
| 10,366,200 B2 * | 7/2019 | Lin | G06F 30/392 |
| 10,664,565 B2 * | 5/2020 | Liu | G06F 30/327 |
| 2014/0040838 A1 * | 2/2014 | Liu | G03F 1/36 716/53 |
| 2015/0278429 A1 * | 10/2015 | Chang | G03F 1/36 716/52 |
| 2015/0303927 A1 * | 10/2015 | Kuenemund | H03K 19/215 326/8 |
| 2018/0336293 A1 * | 11/2018 | Liu | G06F 30/327 |
| 2021/0294958 A1 * | 9/2021 | Liu | G06F 30/327 |

* cited by examiner

AN2-MB8TXFF

| Row# | Input | | | | | | | Output | |
|---|---|---|---|---|---|---|---|---|---|
| | DA(0) | DB(0) | DA(i) | DB(i) | SI | SE | CP | Q(0) | Q(i) |
| 1 | 0 | X | 0 | X | X | 0 | ↗ | 0 | 0 |
| 2 | X | 0 | X | 0 | X | 0 | ↗ | 0 | 0 |
| 3 | 0 | X | 1 | 1 | X | 0 | ↗ | 0 | 1 |
| 4 | X | 0 | 1 | 1 | X | 0 | ↗ | 0 | 1 |
| 5 | 1 | 1 | 0 | X | X | 0 | ↗ | 1 | 0 |
| 6 | 1 | 1 | X | 0 | X | 0 | ↗ | 1 | 0 |
| 7 | 1 | 1 | 1 | 1 | X | 0 | ↗ | 1 | 1 |
| 8 | X | X | X | X | 0 | 1 | ↗ | 0 | Q(i-1) |
| 9 | X | X | X | X | 1 | 1 | ↗ | 1 | Q(i-1) |
| 10 | X | X | X | X | X | X | 0 | Q(0) | Q(i) |
| 11 | X | X | X | X | X | X | 1 | Q(0) | Q(i) |

*↗: clock rising edge (active edge)
**CP: clock/pulse signal
***X: either "0" or "1"

LOGIC CIRCUITS WITH REDUCED TRANSISTOR COUNTS

PRIORITY CLAIM

This application is a continuation of U.S. application Ser. No. 15/930,010, filed May 12, 2020, now U.S. Pat. No. 11,030,366, issued Jun. 8, 2021, which is a continuation of U.S. application Ser. No. 15/936,712, filed Mar. 27, 2018, now U.S. Pat. No. 10,664,565, issued May 26, 2020, which claims the priority of U.S. Provisional Application No. 62/509,048, filed May 19, 2017, which are incorporated by reference herein their entireties.

BACKGROUND

A logic gate is a physical device which implements an elementary Boolean function (also referred to as a 'Boolean expression'). A logic gate performs the Boolean function on one or more binary inputs (also referred to as 'literals') and produces a single binary output. Typically, logic gates are implemented using transistors which act as electronic switches. A logic circuit (also referred to as a 'composite gate') includes multiple logic gates and performs a composite Boolean function (also referred to as a 'compound Boolean function,' a 'complex Boolean function,' 'compound logic,' or the like). A composite Boolean function includes multiple elementary Boolean functions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6B is a truth table for the TXFF function of the logic diagram of FIG. 6A, in accordance with at least one embodiment of the present disclosure.

DETAILED DESCRIPTION

Figure 1A:
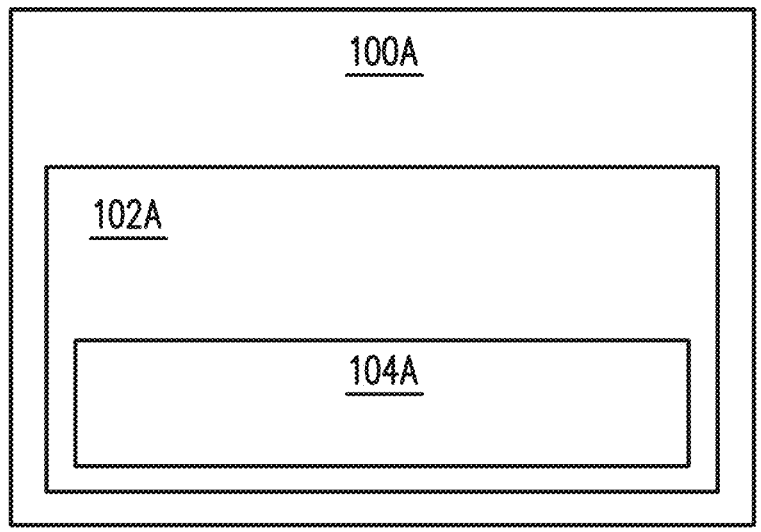
FIG. 1A is a block diagram of a semiconductor device, in accordance with at least one embodiment of the present disclosure.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, a logic gate is a physical device which implements an elementary Boolean function. Examples of logic gates include an AND gate, a NAND gate, an OR gate, a NOR gate, an XOR gate, an XNR gate, a NOT gate (also referred to as an 'inverter circuit,' or more simply as an 'inverter'), or the like. A logic gate receives on one or more binary inputs (also referred to as 'literals') and performs the elementary Boolean function to thereby produce a single binary output. A logic gate is regarded as a one-level device.

Amongst logic gates, some are regarded as 'universal gates' (or 'primitive gates'). A given universal gate is regarded as being universal/primitive because any logic gate can be implemented using only one or more instances of the given universal gate. Widely acknowledged examples of a universal gate are the NAND gate and the NOR gate.

For example, in the terms of the NAND gate being a universal gate, an inverter can be formed from a single NAND gate, an AND gate can be formed of a two serially connected NAND gates, or the like. In the example of the AND gate implemented using NAND gates, the serial connection of the two NAND gates can be described as a first stage connected to a second stage. Despite the possibility that a given logic gate might be implemented using two or more stages of a given universal gate, nevertheless each logic gate is regarded as a one-level device.

A logic circuit (also referred to as a 'composite gate') includes multiple logic gates and performs a composite Boolean function (also referred to as a 'compound Boolean function,' a 'complex Boolean function,' 'compound logic,' or the like). A composite Boolean function, again, includes multiple elementary Boolean functions. A logic circuit receives on one or more binary inputs (also referred to as 'literals') and performs the composite Boolean function to thereby produce a single binary output. Because a logic circuit includes multiple logic gates, a logic circuit is regarded as a two-level device or a multi-level device, which though a two-level device has multiple levels, typically, the term multi-level device connotes a logic circuit having three or more levels.

As used herein, Boolean minimization (also referred to as 'Boolean reduction') refers to the process of reducing a Boolean function to its simplest form. A Boolean expression can be evaluated in terms of costs, e.g., cost of literals (also referred to as 'literals cost' or 'literal cost'), gate input cost, gate input cost with inverters/NOTs, or the like. Boolean minimization reduces such costs. As used herein, gate minimization is a technique to represent a given Boolean function or the corresponding truth table with a minimal first number of logic gates and a corresponding first number of transistors. As used herein, and recalling that logic gates use transistors as switches, switch minimization is a technique to represent the given Boolean function using a second number of transistors which is smaller than the first number of transistors obtained using circuit minimization.

According to some embodiments, one or more macro standard cells are generated and added to a set of standard cells which comprise a library, thereby expanding the set. The one or more macro standard cells correspond to a selected one amongst recurrent ad hoc groups of elementary standard cells. Each new macro standard cell is more efficient than the selected group with respect to one or more parameters. According to another approach for improving the efficiency of the selected group, a corresponding package is generated. The package differs from the selected group in that the elementary standard cells of the selected group are rearranged in the package. The rearrangement uses automatic placement and routing (APR) to pack the elementary standard cells packed optimally close together such that the package is more efficient than the selected group in terms of area (also referred to as 'footprint'), where area is a parameter. The rearrangement corresponds to the selected group in that the 'packing' does not change the individual characteristics of any of the elementary standard cells. For a given elementary standard cell, the package-forming rearrangement does not: change the boundary of the cell, change the number of inputs to the cell; change the shape and/or location of any patterns within the elementary standard cell (wherein such patterns represent conductive structures); or the like. If a corresponding package exists, each new macro standard cell is more efficient than the package with respect to one or more parameters.

According to some embodiments, switch minimization results in a relatively smaller second number of transistors but also in a second number of gates which is the same or greater than the first number of gates obtained using circuit minimization. In some embodiments, switch minimization is used to produce a logic circuit which implements an enable exclusive OR (XOR) (EXOR) function. In some embodiments, switch minimization is used to produce a logic circuit which implements the EXOR function using a combination of an OR-AND-Invert (OAI) circuit and an AND-OR-Invert (AOI) circuit. In some embodiments, switch minimization is used to produce a logic circuit which implements an enable exclusive NOR (XNR) (EXNR) function. In some embodiments, switch minimization is used to produce a logic circuit which implements the EXNR function using a combination of an AOI circuit and an OAI circuit. In some embodiments, switch minimization is used to produce a logic circuit which implements an N-bit multibit flip-flop (MBFF) function.

FIG. 1A is a block diagram of a semiconductor device 100A, in accordance with at least one embodiment of the present disclosure.

In FIG. 1A, semiconductor device 100A includes, among other things, circuit macro/module (hereinafter, macro) 102A. In some embodiments, macro 102A is a combinatorial logic macro. In some embodiments, macro 102A is an arithmetic logic macro. Macro 102A includes an enable exclusive OR (XOR) (EXOR) circuit 104A (see FIGS. 2A-2C and 4A-4B).

In some embodiments, semiconductor device 100A is included within an integrated circuit. In some embodiments, circuit macro/module 102A is understood in the context of an analogy to the architectural hierarchy of modular programming in which subroutines/procedures are called by a main program (or by other subroutines) to carry out a given computational function. In this context, semiconductor device 100A uses circuit macro/module 102A to perform one or more given functions. Accordingly, in this context and in terms of architectural hierarchy, semiconductor device 100A is analogous to the main program and circuit macro/module 102A is analogous to a subroutine/procedure. In some embodiments, macro 102A is a soft macro. In some embodiments, macro 102A is a hard macro. In some embodiments, macro 102A is a soft macro which is described/couched in register-transfer level (RTL) code. In some embodiments, synthesis, placement and routing have yet to have been performed on macro 102A such that the soft macro can be synthesized, placed and routed for a variety of process nodes. In some embodiments, macro 102A is a hard macro which is described/couched in a binary file format (e.g., Graphic Database System II (GDSII) stream format), where the binary file format represents planar geometric shapes, text labels, other information or the like of one or more layout diagrams corresponding to macro 102A. In some embodiments, synthesis, placement and routing have been performed on macro 102A such that the corresponding hard macro is specific to a particular process node.

In some embodiments, macro 102A is a memory macro. In some embodiments, macro 102A is a SRAM system macro. In some embodiments, macro 102A is a memory system macro other than a SRAM system macro. In some embodiments, macro 102A is a comparator. In some embodiments, macro 102A is a discrete Fourier transform (DFT) macro. In some embodiments, macro 102A is a de-glitch macro.

Figure 1B:
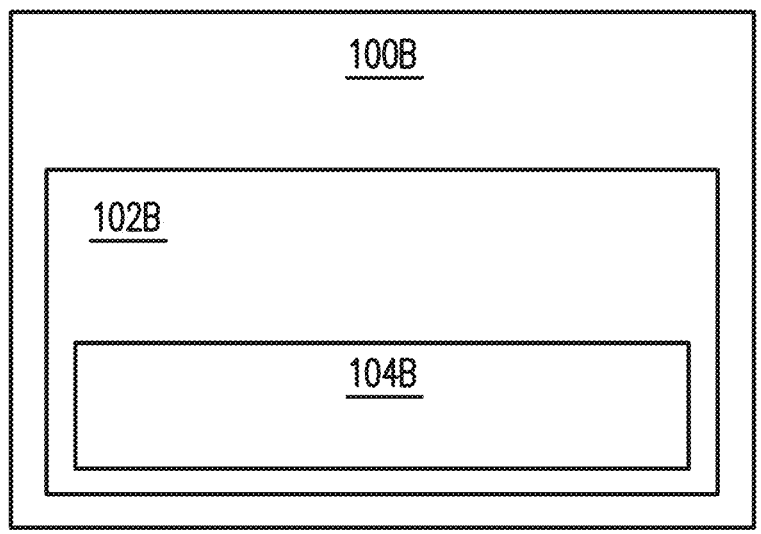
FIG. 1B is a block diagram of a semiconductor device, in accordance with at least one embodiment of the present disclosure.

FIG. 1B is a block diagram of a semiconductor device 100B, in accordance with at least one embodiment of the present disclosure.

Semiconductor device 100B of FIG. 1B is similar to semiconductor device 100A of FIG. 1A. For the sake of brevity, the discussion will focus on differences between semiconductor device 100B and semiconductor device 100A.

In FIG. 1B, semiconductor device 100B includes, among other things, circuit macro/module (hereinafter, macro) 102B. In some embodiments, macro 102B is a combinatorial logic macro. In some embodiments, macro 102B is an arithmetic logic macro. Macro 102B includes an enable exclusive NOR (XNR) (EXNR) circuit 104B (see FIGS. 3A-3C and 5A-5B).

Figure 1C:
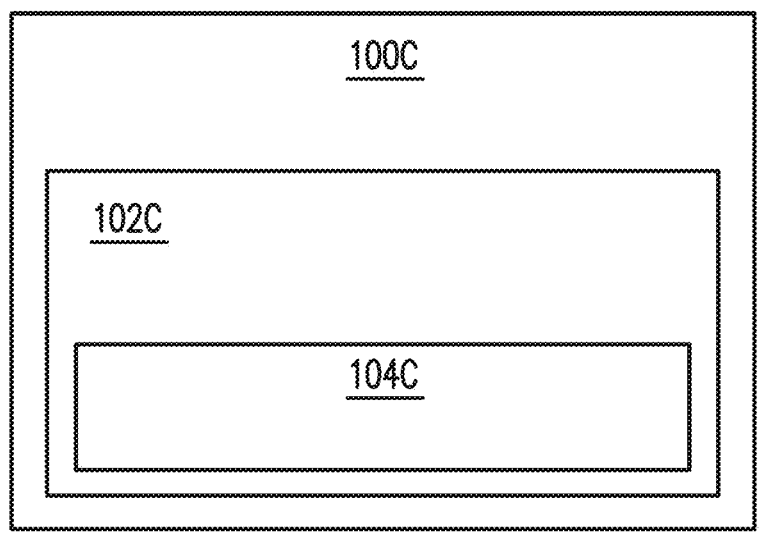
FIG. 1C is a block diagram of a semiconductor device, in accordance with at least one embodiment of the present disclosure.

FIG. 1C is a block diagram of a semiconductor device 100C, in accordance with at least one embodiment of the present disclosure.

Semiconductor device 100C of FIG. 1C is similar to semiconductor devices 100A-100B of corresponding FIGS. 1A-1B. For the sake of brevity, the discussion will focus on differences between semiconductor device 100C and semiconductor devices 102A-102B.

In FIG. 1C, semiconductor device 100C includes, among other things, circuit macro/module (hereinafter, macro) 102C. In some embodiments, macro 102C is a combinatorial logic macro. In some embodiments, macro 102C is an arithmetic logic macro. In some embodiments, macro 102C is a memory system macro. Macro 102B includes a circuit 104C which provides an N-bit multibit transfer flip-flop (MBTFF) function (see FIGS. 6A-6C). In some embodiments, macro 102C is a central processing unit (CPU) macro. In some embodiments, macro 102C is a graphic processing unit (GPU). In some embodiments, macro 102C is a system-on-chip (SOC) macro.

Figure 1D:
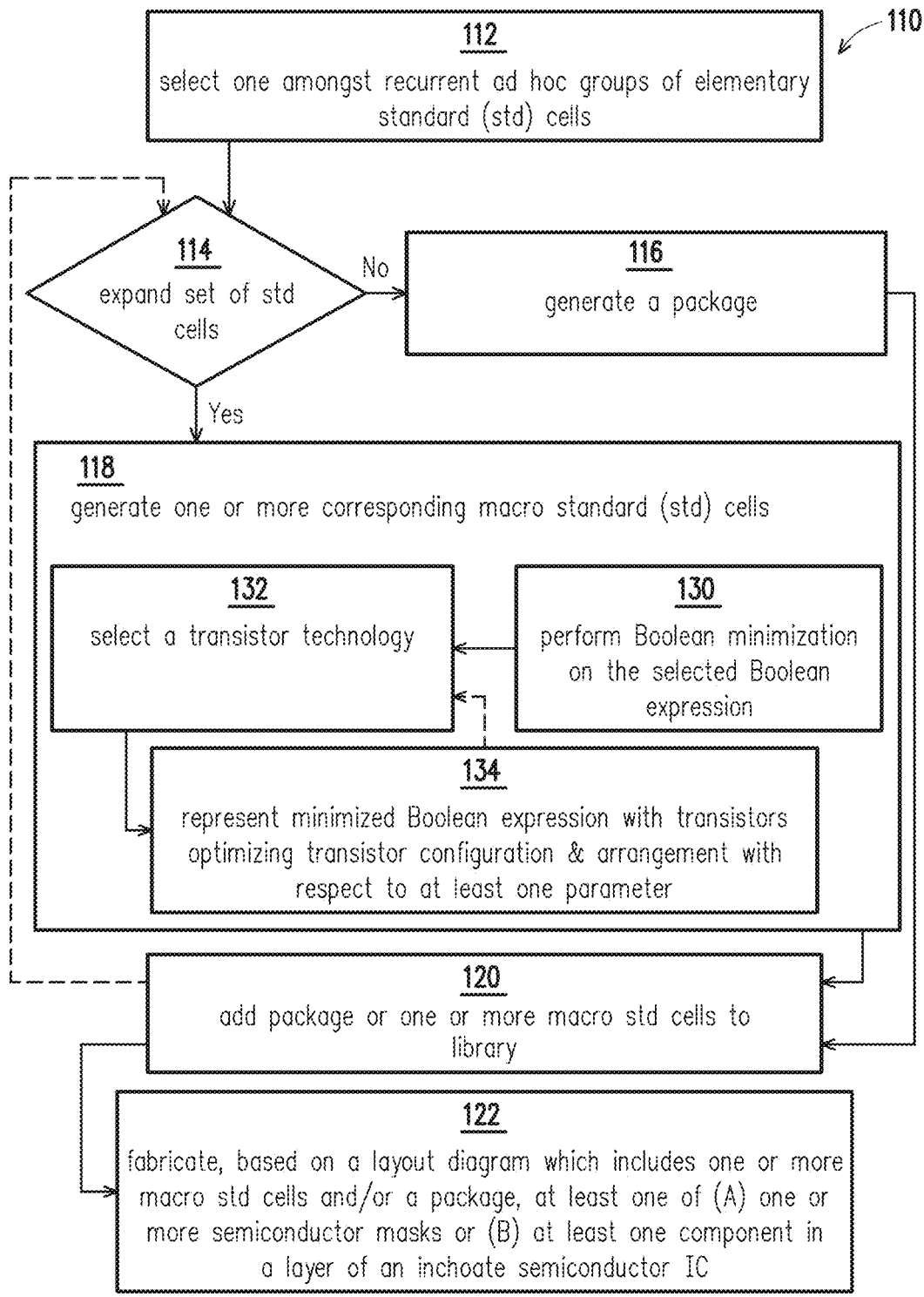
FIG. 1D is a flowchart of a method of expanding a set of standard cells which comprise a library, in accordance with at least one embodiment of the present disclosure.

FIG. 1D is a flowchart of a method 110 of expanding a set of standard cells which comprise a library, the method being in accordance with at least one embodiment of the present disclosure.

In FIG. 1D, method 110 includes blocks 112-122. At block 112, one group is selected amongst recurrent ad hoc groups of elementary standard cells. In some embodiments, a collection of layout diagrams which have been used to fabricate semiconductor devices represent a population, empirical data is extracted from the population, and such empirical data is analyzed to identify ad hoc groups which are recurrent. In some embodiments, for purposes of empirical data analysis, a candidate group is considered to be (A) two or more elementary standard cells (B) which have inputs and connections amongst the themselves so as provide a logical function (representable as a Boolean expression). In some embodiments, if each of two or more candidate groups includes substantially the same two or more elementary cells and provides substantially the same logical function, then each of the two or more candidate groups is regarded as representing an instance of the same recurrent group. In some embodiments, the recurrent groups are organized by sorting according to the number of instances of a recurrent group. In some embodiments, a group is selected based on the number of instances of a recurrent group.

For a given recurrent group, the elementary standard cells in the given recurrent group have connections so as to represent a corresponding logic circuit. Each elementary standard cell represents a logic gate. Each elementary standard cell is a member of a set of standard cells, and the set comprises a library. The selected group provides a logical function (hereinafter, the selected logical function) which can be represented as a Boolean expression (hereinafter, the selected Boolean expression). Examples of a recurrent group of elementary standard cells is the group represented by logic diagram 200A (discussed below), logic diagram 300A (discussed below), or the like. From block 112, flow proceeds to block 114.

At block 114, it is determined if the set of standard cells (which, again, comprise the library) is to be expanded by adding macro standard cells. If the outcome of decision block 114 is negative (NO), then flow proceeds to block 116. At block 116, the selected group is 'packaged' such that a package representing the selected group is generated. Generation of a package represents another approach to improving efficiency of the selected group. The package differs from the selected group in that the elementary standard cells of the selected group are rearranged in the package. The rearrangement uses automatic placement and routing (APR) to pack the elementary standard cells packed optimally close together such that the package is more efficient than the selected group in terms of area (also referred to as 'footprint'), where area is a parameter. The rearrangement corresponds to the selected group in that the 'packing' does not change the individual characteristics of any of the elementary standard cells. For a given elementary standard cell, the package-forming rearrangement does not: change the boundary of the cell, change the number of inputs to the cell; change the shape and/or location of any patterns within the elementary standard cell (wherein such patterns represent conductive structures); or the like. From block 116, flow proceeds to block 120 (discussed below).

If the outcome of decision block 114 is positive (YES), then flow proceeds to block 118. At block 118, one or more corresponding macro standard cells are generated, in accordance with at least one embodiment of the present disclosure. The one or more corresponding macro standard cells are used to expand the library (see block 120, discussed below). Each new macro standard cell represents the selected logic circuit. Each new macro standard cell is more efficient than the selected group with respect to one or more parameters (see block 134, discussed below). If a corresponding package exists, each new macro standard cell is more efficient than the package with respect to one or more parameters (again, see block 134, discussed below). In some embodiments, each new macro standard cell provides the selected logical function albeit without having retained all of the elementary standard cells included in the selected group. From block 118, flow proceeds to block 120.

In some embodiments, block 118 includes blocks 130-132. At block 130, Boolean minimization is performed on the selected Boolean expression, resulting in a minimized Boolean expression. Boolean minimization uses techniques including Karnaugh mapping, the Quine-McCluskey algorithm, or the like. From block 130, flow proceeds to block 132. At block 132, a transistor technology is selected with respect to which the one or more corresponding macro cells will be configured. Examples of the transistor technology include CMOS, bipolar TTL, ECL, or the like. From block 132, flow proceeds to block 134. At block 134, the minimized Boolean expression is represented with transistors of the selected transistor technology, which includes establishing connections amongst the transistors of the selected transistor technology so as to provide the minimized Boolean expression. Moreover, at block 134, the configuration and arrangement of transistors is optimized with respect to at least one parameter. Parameters include, for example, area/footprint, power consumption, driving capability, speed, fan-out, speed-power product, or the like. In some embodiments, flow optionally loops back to block 132 from block 134.

As noted, flow proceeds to block 120 from each of blocks 116 and 118. At block 120, one or more items are added to the library. If flow proceeds from block 116 to block 120, then a package is added to the library. If flow proceeds from block 118 to block 120, then one or more macro standard cells are added to the library. From block 120, flow proceeds to block 122. In some embodiments, flow optionally loops back to block 114 before ultimately proceeding to block 122.

At block 122, based on a layout diagram which includes one or more macro standard cells and/or a package, at least one of (A) one or more semiconductor masks or (B) at least one component in a layer of an inchoate semiconductor integrated circuit is/are fabricated. An example of a facility to fabricate one or more semiconductor masks is mask house 930 of FIG. 9 (discussed below). An example of a facility to fabricate at least one component in a layer of an inchoate semiconductor integrated circuit (IC) is fab 940 of FIG. 9 (discussed below).

Figure 1E:
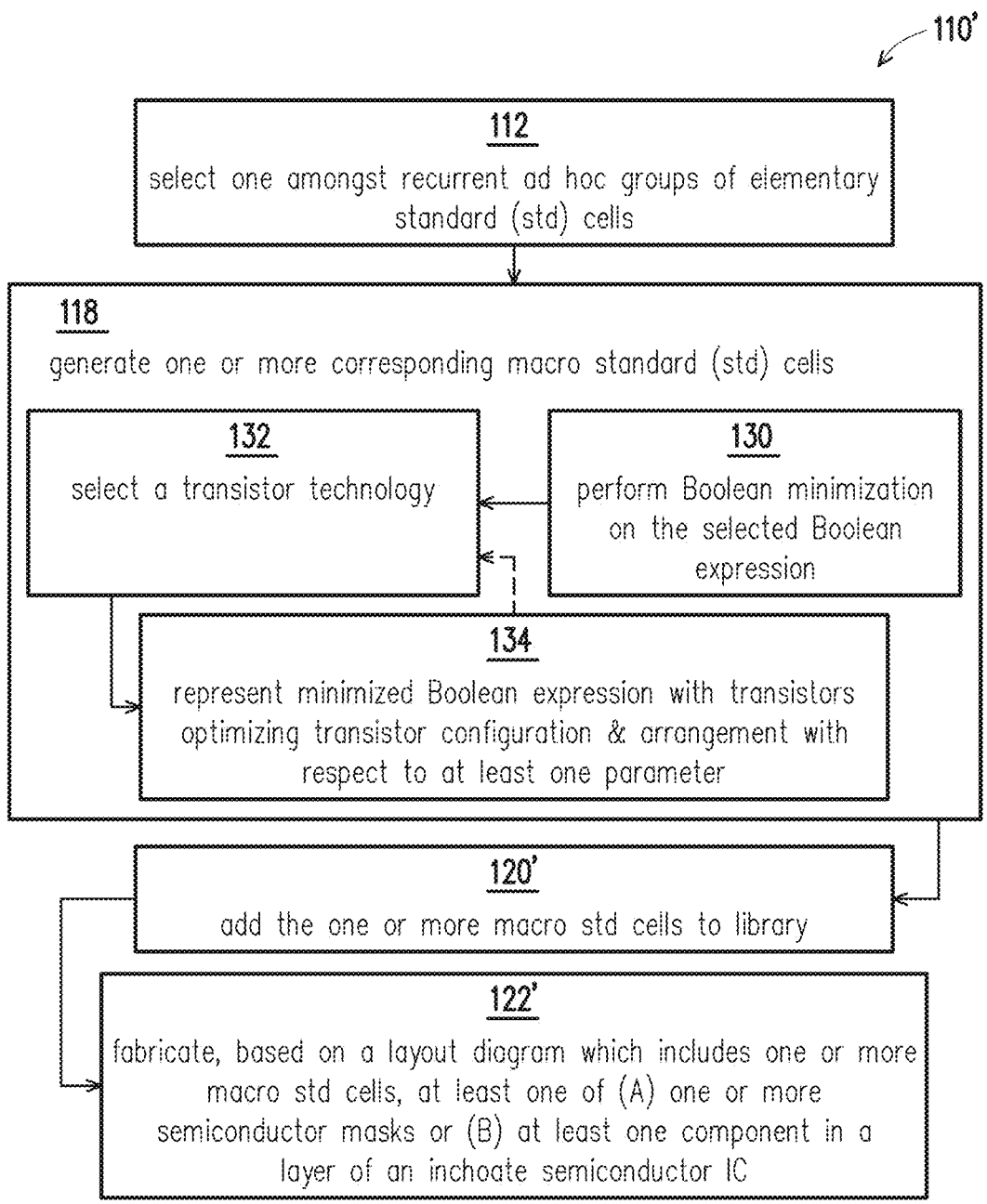
FIG. 1E is a flowchart of a method of expanding a set of standard cells which comprise a library, in accordance with at least one embodiment of the present disclosure.

FIG. 1E is a flowchart of a method 110' of expanding a set of standard cells which comprise a library, the method being in accordance with at least one embodiment of the present disclosure.

Method 110' of FIG. 1E is similar to method 110 of FIG. 1D. For purposes of brevity, the discussion of method 110' will focus on differences of method 110' with respect to method 110.

Method 110' includes blocks 112, 118, 120' and 122'. Unlike method 110, method 110' does not include blocks 114 and 116. Rather, in method 110', flow proceeds from block 112 to block 118. From block 118, flow proceeds to block 120'. At block 120', the one or more macro standard cells are added to the library. From block 120', flow proceeds to block 122'. At block 122', based on a layout diagram which includes one or more macro standard cells, at least one of (A) one or more semiconductor masks or (B) at least one component in a layer of an inchoate semiconductor integrated circuit is/are fabricated.

Figures 2A, 2B:
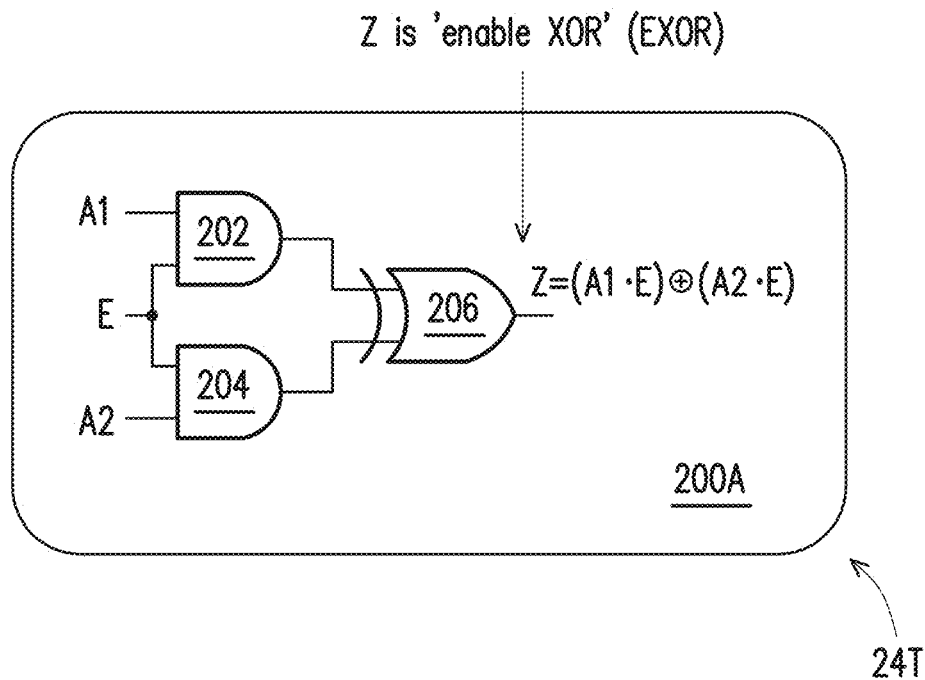
FIG. 2A is a logic diagram of an enable exclusive OR (enable XOR) (EXOR) function, and is an example of a group of elementary standard cells to which the method of FIG. 1D can be applied.
FIG. 2B is a truth table for the enable XOR (EXOR) function of the logic diagram of FIG. 2A, in accordance with at least one embodiment of the present disclosure.

FIG. 2A is a logic diagram 200A of an enable exclusive OR (enable XOR) (EXOR) function (hereinafter, EXOR 200A). EXOR diagram 200A is an example of a group of elementary standard cells to which method 110 of FIG. 1D can be applied. EXOR 200A is an example of a logic diagram corresponding to EXOR circuit 104A of FIG. 1A.

In FIG. 2A, EXOR 200A includes: a two input AND gate 202; a two input AND gate 204; and a two input exclusive OR (XOR) gate 206. A first input of AND gate 202 is connected to a first signal source (not shown) which provides a data signal A1. A first input of AND gate 204 is connected to a second signal source (not shown) which provides a data signal A2. A second input of each of AND gates 202 and 204 is connected to a third signal source (not shown) which provides a control signal, enable signal E.

An output of each of AND gates 202 and 204 is connected to corresponding first and second input terminals of XOR gate 206. An output of XOR gate 206 represents the EXOR function as the variable Z, where $Z=(A1 \cdot E) \oplus (A2 \cdot E)$, Stated in words rather than as a Boolean expression, Z is the XOR function ($\oplus$) applied to two inputs. The first input is the AND function ($\cdot$) applied to data signal A1 and control signal E (namely, A1•E). The second input is the AND function ($\cdot$) applied to data signal A2 and control E (namely, A2•E).

In some embodiments, EXOR 200A is the result of applying gate minimization to the EXOR function, which results in a total of 3 logic gates. In some embodiments in which EXOR 200A is implemented in CMOS technology, the 3 logic gates of EXOR 200A are implementable using 24 transistors (24T).

FIG. 2B is a truth table for the enable XOR (EXOR) function of EXOR 200A, in accordance with at least one embodiment of the present disclosure.

In the truth table of FIG. 2B, when control signal E has a logical zero state (E=0), the output of EXOR 200A, namely Z, is Z=0 regardless of the logical states of inputs A1 and A2. As such, when E=0, EXOR 200A behaves like a buffer with respect to control signal E. When control signal E has a logical one state (E=1), in effect, Z is the same as if the XOR function were to be applied only to inputs A1 and A2 such that Z=A1$\oplus$A2.

Figure 2C:
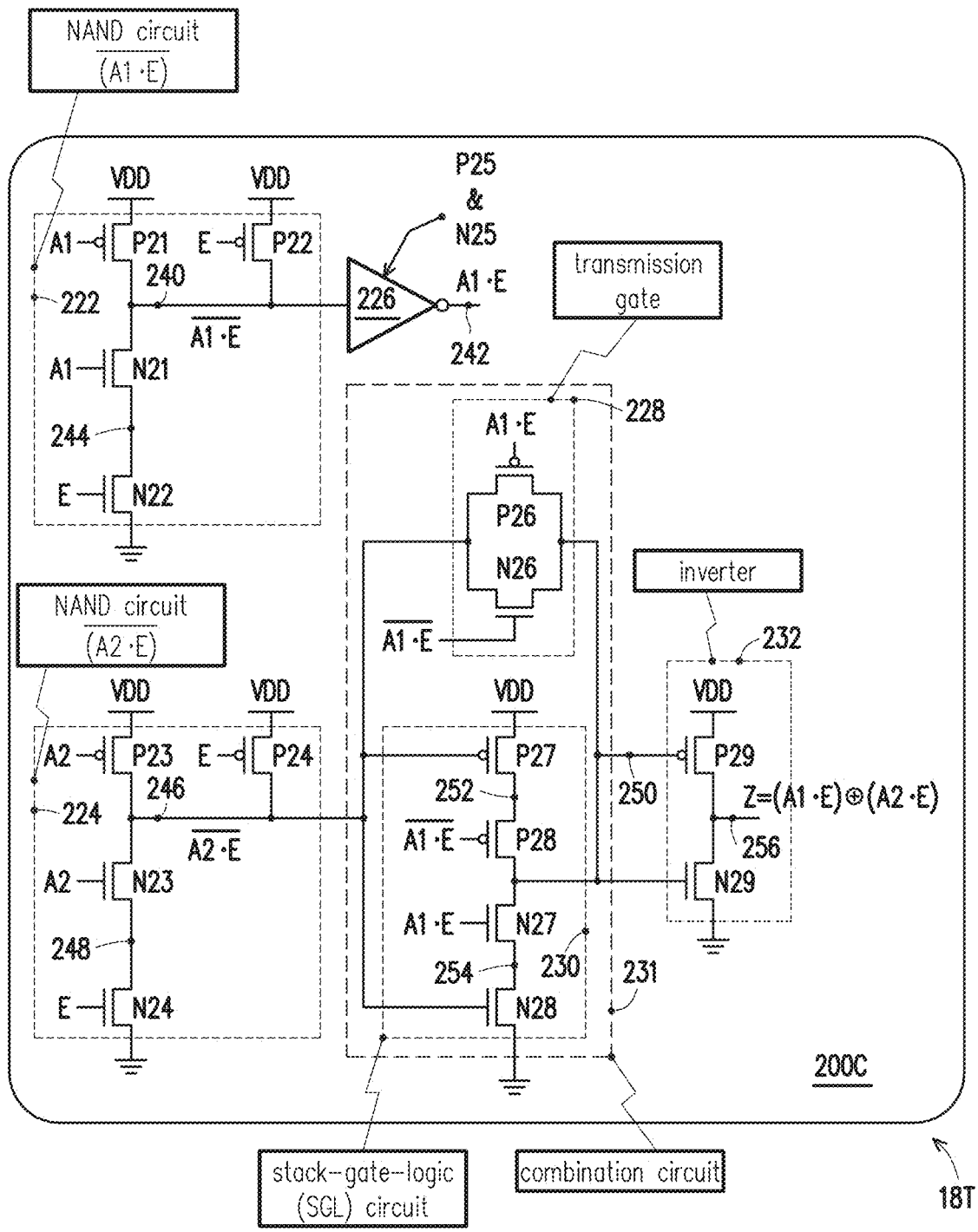
FIG. 2C is a schematic diagram of a logic circuit which provides an enable XOR (EXOR) function, in accordance with at least one embodiment of the present disclosure.

FIG. 2C is a schematic diagram of a logic circuit 200C which provides an enable XOR (EXOR) function, in accordance with at least one embodiment of the present disclosure. Logic circuit 200C is an example of EXOR circuit 104A of FIG. 1A. Logic circuit 200C is an example of circuit based on a layout diagram which includes a macro standard cell, where the macro standard cell results from method 110 of FIG. 1D.

In FIG. 2C, logic circuit 200C includes: a NAND circuit 222; a NAND circuit 224; an inverter 226; a transmission gate 228; a stack-gate-logic (SGL) circuit 230; and an inverter 232. Together, transmission gate 228 and SGL circuit 230 represent a combination circuit 231.

In terms of logical function, NAND circuit 222 provides the logical function $\overline{A1 \cdot E}$. Taken together, NAND circuit 222 and inverter 226 provide an AND function, here A1•E. NAND circuit 224 provides the logical function $\overline{A2 \cdot E}$. Combination circuit 231 provides an exclusive NOR (XNR) function. Taken together, combination circuit 231 and inverter 232 provide the XOR function. It is noted that FIG. 2B is the truth table for EXOR 200A and also for logic circuit 200C.

In terms of transistors, NAND circuit 222 is represented by a set of transistors which includes PMOS transistors P21-P22 and NMOS transistors N21-N22. NAND 224 is represented by a set of transistors which includes PMOS transistors P23-P24, and NMOS transistors N23-N24. Inverter 226 is represented by a set of transistors which includes PMOS transistor P25 (not shown) and NMOS transistor N25 (not shown). Transmission gate 228 is represented by a set of transistors which includes PMOS transistor P26 and NMOS transistor N26. SGL circuit 230 is represented by a set of transistors which includes PMOS transistors P27-P28 and NMOS transistors N27-N28. Inverter 232 is represented by a set of transistors which includes PMOS transistor P29 and NMOS transistor N29. In FIG. 2C, logic circuit 200C is implemented with CMOS technology. In some embodiments, logic circuit 200C is implemented with technology other than CMOS technology.

In terms of arrangement, regarding NAND circuit 222, transistors P21 and P22 are connected in parallel between a first reference voltage and a node 240. An output of NAND circuit 222 is provided on node 240. A signal on node 240 represents the logical function $\overline{A1 \cdot E}$. In FIG. 2C, the first reference voltage is VDD. In some embodiments, the first reference voltage is a voltage other than VDD. Transistor N21 is connected between node 240 and a node 244. Transistor N22 is connected between node 244 and a second reference voltage. In FIG. 2C, the second reference voltage is VSS. In some embodiments. The second reference voltage is a voltage other than VSS. Gate electrodes of each of transistors P21 and N21 are configured to receive data signal A1. Gate electrodes of transistors P22 and N22 are configured to receive control signal E. Node 240 is connected to an input of inverter 226. An output of inverter 226 is provided on a node 242. A signal on node 242 represents the logical function A1•E.

Also in terms of arrangement, regarding NAND circuit 224, transistors P23 and P24 are connected in parallel between VDD and a node 246. An output of NAND circuit 224 is provided on node 246. A signal on node 246 represents the logical function $\overline{A2 \cdot E}$. Transistor N23 is connected between node 246 and a node 248. Transistor N24 is connected between node 248 and VSS. Gate electrodes of each of transistors P23 and N23 are configured to receive data signal A2. Gate electrodes of transistors P24 and N24 are configured to receive control signal E.

Also in terms of arrangement, combination circuit 231 has an input which is connected to node 246. An output of combination circuit 231 is provided on a node 250. Regarding transmission gate 228, transistors P26 and N26 are connected in parallel between node 246 and node 250. A gate electrode of transistor P26 is configured to receive the signal (on node 242) representing the logical function A1•E. A gate electrode of transistor N26 is configured to receive the signal (on node 240) representing the logical function $\overline{A1 \cdot E}$. Regarding SGL circuit 230, transistor P27 is connected between VDD and a node 252. Transistor P28 is connected between node 252 and node 250. Transistor N27 is connected between node 250 and a node 254. Transistor N28 is connected between node 254 and VSS. Gate electrodes of each of transistors P27 and N28 are configured to receive the signal (on node 246) which represents the logical function $\overline{A2 \cdot E}$. A gate electrode of transistor P28 is configured to receive the signal (on node 240) representing the logical function $\overline{A1 \cdot E}$. A gate electrode of transistor N27 is configured to receive the signal (on node 242) representing the logical function A1•E. Also in terms of arrangement, regarding inverter 232, transistor P29 is connected between VDD and a node 256. Transistor N29 is connected between node 256 and VSS. An output of inverter 232, and thus of logic circuit 200C, is provided on node 256. A signal on node 256 represents the logical function Z=(A1•E)⊕(A2•E).

SGL circuit 230 has both similarities and differences with respect to transmission gate 228. In addition to including twice as many transistors, SGL circuit 230 has a serial arrangement of transistors whereas transmission gate 228 has a parallel arrangement of transistors. SGL circuit 230 is similar to transmission gate 228 in that each is configured to receive, as control signals, the signal on node 246 (which represents the logical function $\overline{A2 \cdot E}$) and the signal on node 242 (representing the logical function A1•E. While each of SGL circuit 230 and transmission gate 228 is configured to receive, as an input, the signal on node 246 (which represents the logical function $\overline{A2 \cdot E}$), nevertheless they also differ, e.g., in that: SGL circuit 230 is configured to generate, while transistors P28 and N27 are turned on, a signal on node 250 which has an inverse polarity relative to the signal on node 246; and transmission gate 228 is configured to generate, while transistors P26 and N26 are turned on, a signal on node 250 which has the same polarity relative to the signal on node 246.

As shown in FIG. 2C, logic circuit 200C includes 18 transistors (18T). In some embodiments, logic circuit 200C is the result of applying a first level of switch minimization to the EXOR function. Whereas circuit minimization of the EXOR function is represented by the 3 gates of EXOR 200A which are implementable using 24 transistors (24T), first level switch minimization of the EXOR function is represented by the five gates in FIG. 200C (four gates if NAND circuit 222 and inverter 226 are regarded as one AND gate) which are implementable using 18 transistors (18T). A decrease from 24T to 18T represents a 25% reduction in transistor count. In some embodiments, as compared to the 24T implementation of EXOR 200A, the 18T implementation of logic circuit 200C consumes about 98% less power when control signal E has a logical zero state (E=0).

Logic circuit 200C has been optimized for driving capability. With respect to an EXOR circuit (not shown) resulting from an ad hoc group corresponding to EXOR 200A, logic circuit 200C has better driving capability. In some embodiments, logic circuit 200C is optimized for a parameter other than driving capability.

Figure 2D:
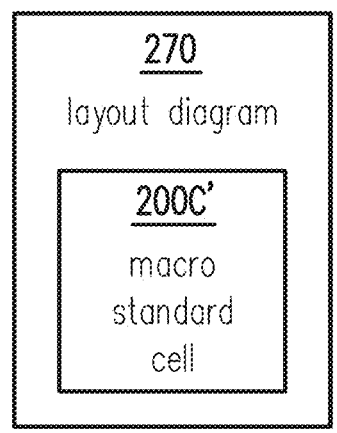
FIG. 2D is a layout diagram, in accordance with at least one embodiment of the present disclosure.

FIG. 2D is a layout diagram 270, in accordance with at least one embodiment of the present disclosure.

Layout diagram 270 includes a macro standard cell 200C', where macro standard cell 200C' corresponds to logic circuit 200C of FIG. 2C. In some embodiments, layout diagram 270 is generated, e.g., by an EDA system 800 (see FIG. 8, discussed below) or a design house 920 (see FIG. 9, discussed below). In some embodiments, macro standard cell 200C' is a standard cell included in a set 826 of standard cells, where set 826 comprises a library 824 (see FIG. 8, discussed below).

Figures 3A, 3B:
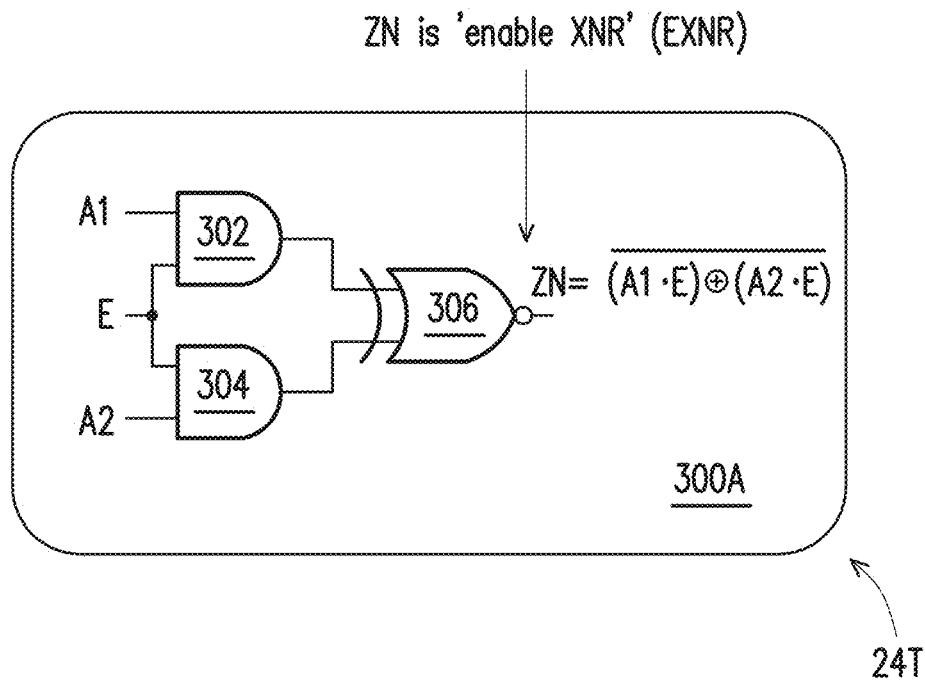
FIG. 3A is a logic diagram of an enable exclusive NOR (enable XNR) (EXNR) function, and is an example of a group of elementary standard cells to which the method of FIG. 1D can be applied.
FIG. 3B is a truth table for the enable XNR (EXNR) function of the logic diagram of FIG. 3A, in accordance with at least one embodiment of the present disclosure.

FIG. 3A is a logic diagram 300A of an enable exclusive NOR (enable XNR) (EXNR) function (hereinafter, EXNR 300A). EXNR 300A is an example of a group of elementary standard cells to which method 110 of FIG. 1D can be applied. EXNR 300A is an example of a logic diagram corresponding to EXNR circuit 104B of FIG. 1B.

In FIG. 3A, EXNR 300A includes: a two input AND gate 302; a two input AND gate 304; and a two input exclusive NOR (XNR) gate 306. A first input of AND gate 302 is connected to a first signal source (not shown) which provides a data signal A1. A first input of AND gate 304 is connected to a second signal source (not shown) which provides a data signal A2. A second input of each of AND gates 302 and 304 is connected to a third signal source (not shown) which provides a control signal, enable signal E.

An output of each of AND gates 302 and 304 is connected to corresponding first and second input terminals of XNR gate 306. An output of XNR gate 306 represents the EXNR function as the variable ZN, where $$ZN=\overline{(A1\bullet E)\oplus(A2\bullet E)},$$

Stated in words rather than as a Boolean expression, ZN is the XNR function ($\overline{\oplus}$) applied to two inputs. The first input is the AND function ( ) applied to data signal A1 and control signal E (namely, A1•E). The second input is the AND function ( ) applied to data signal A2 and control E (namely, A2ΨE).

In some embodiments, EXNR 300A is the result of applying gate minimization to the EXNR function, which results in a total of 3 logic gates. In some embodiments in which EXNR 300A is implemented in CMOS technology, the 3 logic gates of EXNR diagram 300A are implementable using 24 transistors (24T).

FIG. 3B is a truth table for the enable XNR (EXNR) function of EXNR 300A, in accordance with at least one embodiment of the present disclosure.

Figure 3C:
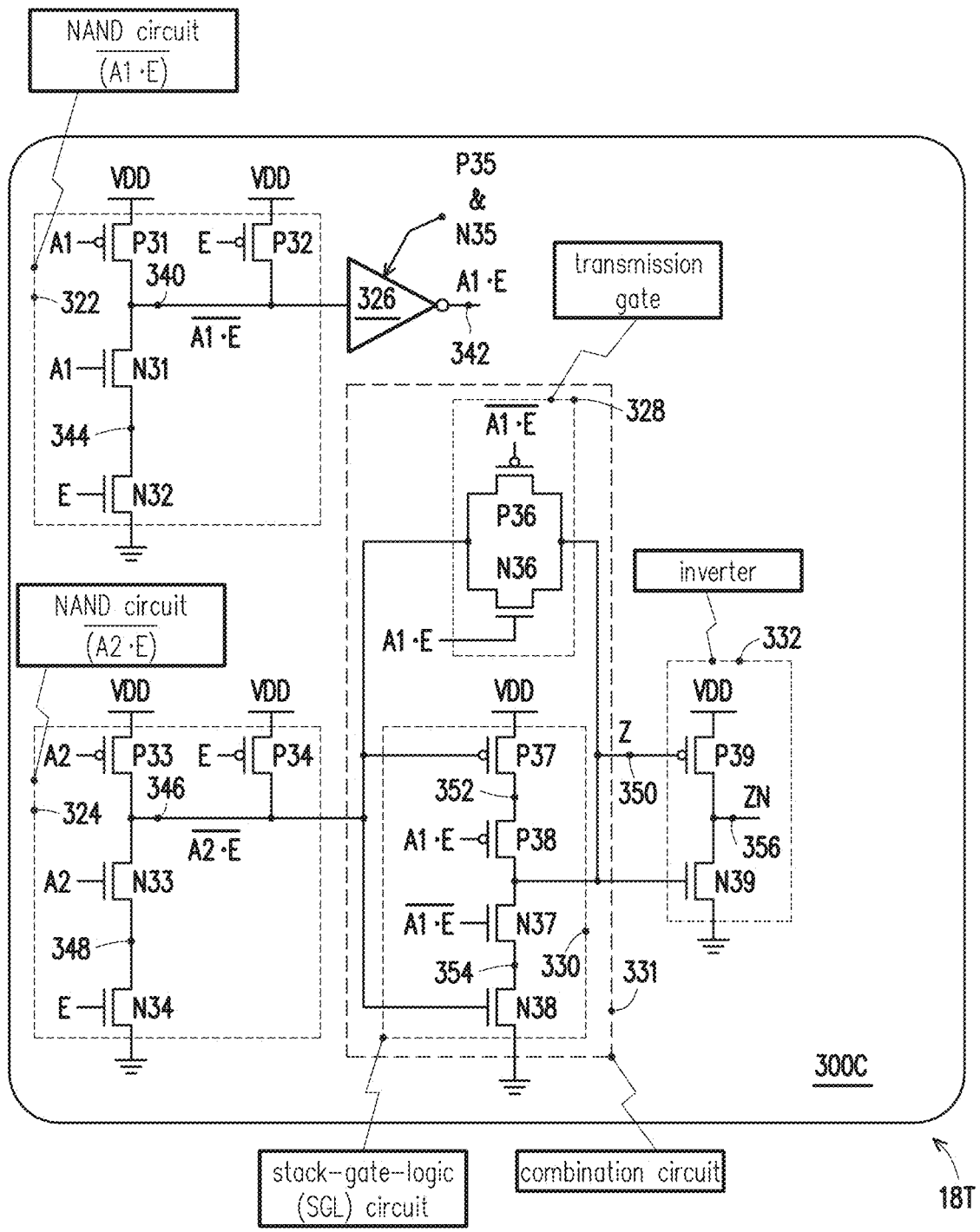
FIG. 3C is a schematic diagram of a logic circuit which provides an enable XNR (EXNR) function, in accordance with at least one embodiment of the present disclosure.

FIG. 3C is a schematic diagram of a logic circuit 300C which provides an enable XNR (EXNR) function, in accordance with at least one embodiment of the present disclosure. Logic circuit 300C is an example of EXNR circuit 104B of FIG. 1B. Logic circuit 300C is an example of circuit based on a layout diagram which includes a macro standard cell, where the macro standard cell results from method 110 of FIG. 1D.

In the truth table of FIG. 3B, when control signal E has a logical zero state (E=0), the output of ENXR 300A, namely ZN, is ZN=1 regardless of the logical states of inputs A1 and A2. As such, when E=0, EXNR 300A behaves like an inverter with respect to control signal E. When control signal E has a logical one state (E=1), in effect, ZN is the same as if the XNR function were to be applied only to inputs A1 and A2 such that $$ZN=\overline{A1\oplus A2}.$$

In FIG. 3C, logic circuit 300C includes: a NAND circuit 322; a NAND circuit 324; an inverter 326; a transmission gate 328; a stack-gate-logic (SGL) circuit 330; and an inverter 332. Together, transmission gate 328 and SGL circuit 330 represent a combination circuit 331.

In terms of logical function, NAND circuit 322 provides the logical function $\overline{A1\bullet E}$. Taken together, NAND circuit 322 and inverter 326 provide the AND function, here A1•E. NAND circuit 324 provides the logical function $\overline{A2\bullet E}$. Combination circuit 331 provides the XOR function. Taken together, combination circuit 331 and inverter 332 provide the XNR function. It is noted that FIG. 3B is the truth table for EXNR 300A and also for logic circuit 300C.

In terms of transistors, NAND circuit 322 is represented by a set of transistors which includes PMOS transistors P31-P32 and NMOS transistors N31-N32. NAND 324 is represented by a set of transistors which includes PMOS transistors P33-P34, and NMOS transistors N33-N34. Inverter 326 is represented by a set of transistors which includes PMOS transistor P35 (not shown) and NMOS transistor N35 (not shown). Transmission gate 328 is represented by a set of transistors which includes PMOS transistor P36 and NMOS transistor N36. SGL circuit 330 is represented by a set of transistors which includes PMOS transistors P37-P38 and NMOS transistors N37-N38. Inverter 323 is represented by a set of transistors which includes PMOS transistor P39 and NMOS transistor N39.

In terms of arrangement, regarding NAND circuit 322, transistors P31 and P32 are connected in parallel between a first reference voltage and a node 340. An output of NAND circuit 322 is provided on node 340. A signal on node 340 represents the logical function $\overline{A1\bullet E}$. In FIG. 3C, the first reference voltage is VDD. In some embodiments, the first reference voltage is a voltage other than VDD. Transistor N31 is connected between node 340 and a node 344. Transistor N32 is connected between node 344 and a second reference voltage. In FIG. 3C, the second reference voltage is VSS. In some embodiments. the second reference voltage is a voltage other than VSS. Gate electrodes of each of transistors P31 and N31 are configured to receive data signal A1. Gate electrodes of transistors P32 and N32 are configured to receive control signal E. Node 340 is connected to an input of inverter 326. An output of inverter 326 is provided on a node 342. A signal on node 342 represents the logical function A1•E.

Also in terms of arrangement, regarding NAND circuit 324, transistors P33 and P34 are connected in parallel between VDD and a node 346. An output of NAND circuit 324 is provided on node 346. A signal on node 346 represents the logical function $\overline{A2\bullet E}$. Transistor N33 is connected between node 346 and a node 348. Transistor N34 is connected between node 348 and VSS. Gate electrodes of each of transistors P33 and N33 are configured to receive data signal A2. Gate electrodes of transistors P34 and N34 are configured to receive control signal E.

Also in terms of arrangement, combination circuit 331 has an input which is connected to node 346. An output of combination circuit 331 is provided on a node 350. Regarding transmission gate 328, transistors P36 and N36 are connected in parallel between node 346 and node 350. A gate electrode of transistor P36 is configured to receive the signal (on node 340) representing the logical function $\overline{A1\bullet E}$. A gate electrode of transistor N36 is configured to receive the signal (on node 342) representing the logical function A1•E. Regarding SGL circuit 330, transistor P37 is connected between VDD and a node 352. Transistor P38 is connected between node 352 and node 350. Transistor N37 is connected between node 350 and a node 354. Transistor N38 is connected between node 354 and VSS. Gate electrodes of each of transistors P37 and N38 are configured to receive the signal (on node 346) which represents the logical function $\overline{A2\bullet E}$. A gate electrode of transistor P38 is configured to receive the signal (on node 342) representing the logical function A1•E. A gate electrode of transistor N37 is configured to receive the signal (on node 340) representing the logical function $\overline{A1\bullet E}$.

Also in terms of arrangement, regarding inverter 332, transistor P39 is connected between VDD and a node 356. Transistor N39 is connected between node 356 and VSS. An output of inverter 332, and thus of logic circuit 300C, is provided on node 356. A signal on node 356 represents the logical function $ZN=\overline{(A1\bullet E)\oplus(A2\bullet E)}$.

As shown in FIG. 3C, logic circuit 300C includes 18 transistors (18T). In some embodiments, logic circuit 300C is the result of applying a first level of switch minimization to the EXNR function. Whereas circuit minimization of the EXNR function is represented by the 3 gates of EXNR 300A which are implementable using 24 transistors (24T), first level switch minimization of the EXNR function is represented by the five gates in FIG. 300C (four gates if NAND circuit 322 and inverter 326 are regarded as one AND gate) which are implementable using 18 transistors (18T). A decrease from 24T to 18T represents a 25% reduction in transistor count. In some embodiments, as compared to the 24T implementation of EXNR 300A, the 18T implementation of logic circuit 300C consumes about 98% less power when control signal E has a logical zero state (E=0).

Logic circuit 300C has been optimized for driving capability. With respect to an EXNR circuit (not shown) resulting from an ad hoc group corresponding to EXNR 300A, logic circuit 300C has better driving capability. In some embodiments, logic circuit 300C is optimized for a parameter other than driving capability.

Figure 3D:
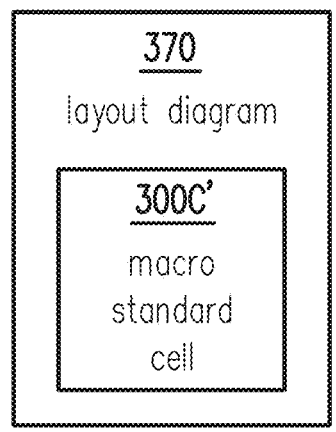
FIG. 3D is a layout diagram, in accordance with at least one embodiment of the present disclosure.

FIG. 3D is a layout diagram 370, in accordance with at least one embodiment of the present disclosure.

Layout diagram 370 includes a macro standard cell 300C', where macro standard cell 300C' corresponds to logic circuit 300C of FIG. 3C. In some embodiments, layout diagram 370 is generated, e.g., by EDA system 800 (see FIG. 8, discussed below) or design house 920 (see FIG. 9, discussed below). In some embodiments, macro standard cell 300C' is a standard cell included in set 826 of standard cells, where set 826 comprises a library 824 (see FIG. 8, discussed below).

Figure 4A:
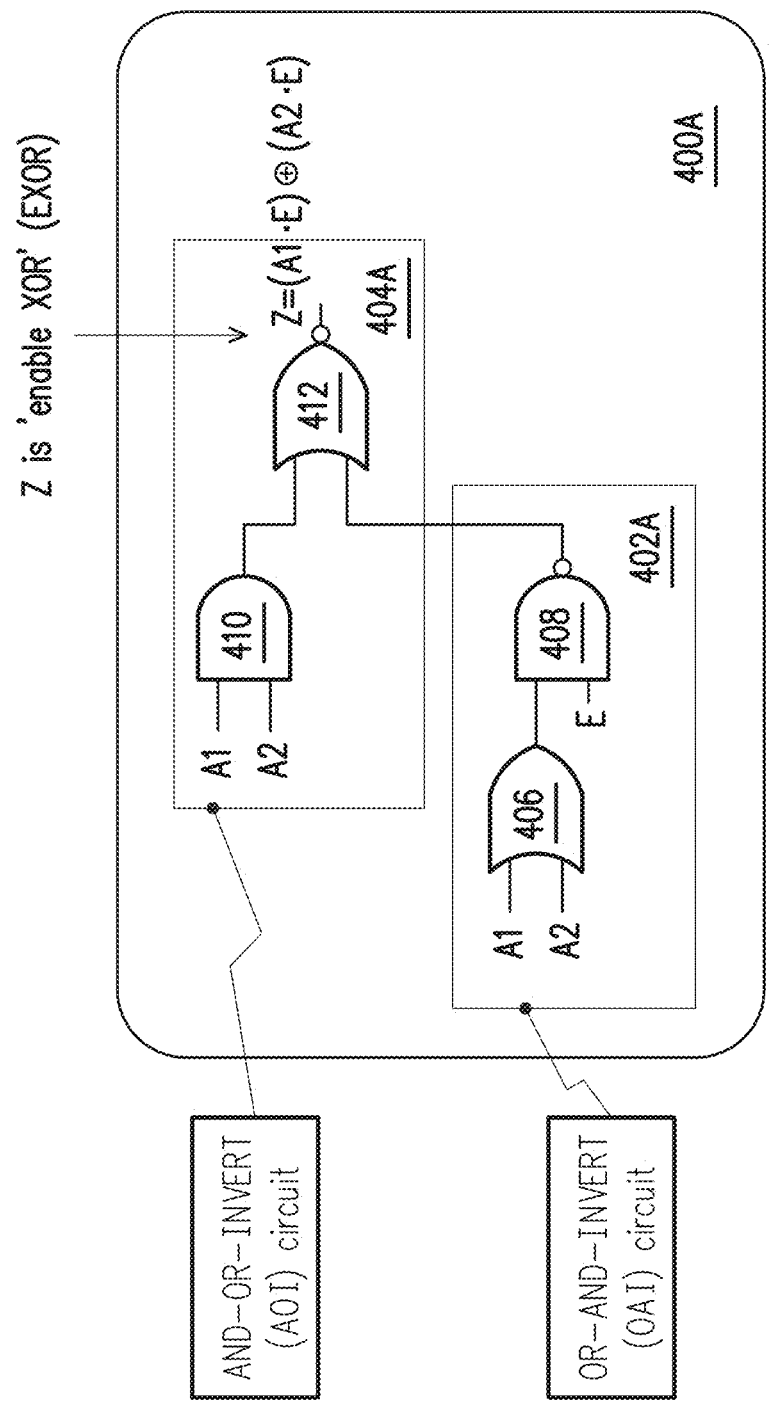
FIG. 4A is a logic diagram of an enable XOR (EXOR) function, in accordance with at least one embodiment of the present disclosure.

FIG. 4A is a logic diagram 400A of an enable XOR (EXOR) function, in accordance with at least one embodiment of the present disclosure. Logic diagram 400A is an example of a logic diagram corresponding to EXOR circuit 104A of FIG. 1A.

In FIG. 4A, logic diagram 400A includes: an OR-AND-INVERT (OAI) logic diagram (OAI diagram) 402A and an AND-OR-INVERT (AOI) logic diagram (AOI diagram) 404A. Each of OAI diagram 402A and AOI diagram 404A has three inputs and one output. OAI diagram 402A is configured to receive a data signal A1, a data signal A2 and a control signal, enable signal E, as inputs. AOI diagram 404A is configured to receive data signals A1 and A2, and the output of OAI diagram 402A, as inputs. The output of logic diagram 400A is represented by the output of AOI diagram 404A.

OAI diagram 402A includes a two-input OR gate 406 and a two-input NAND gate 408. First and second inputs of OR gate 406 are configured to receive corresponding data signals A1 and A2. First and second inputs of NAND gate 408 are configured to receive correspondingly an output of OR gate 406 and a control signal E. The output of OAI diagram 402A is provided at the output of NAND gate 408, and represents the logical function $\overline{(A1+A2) \cdot E}$.

AOI diagram 404A includes a two-input AND gate 410 and a two-input NOR gate 412. First and second inputs of AND gate 410 are configured to receive corresponding data signals A1 and A2. First and second inputs of NOR gate 412 are configured to receive correspondingly an output of AND gate 410 and the output of OAI diagram 402A (the latter being represented by the output of NAND gate 408). The output of AOI diagram 404A is provided at the output of NOR gate 412, and represents the logical function $\overline{(A1 \cdot A2)+INPUT3}$, where INPUT3=$\overline{(A1+A2) \cdot E}$.

The output of logic diagram 400A is represented by the output of AOI diagram 404A (the latter being represented by the output of NOR gate 412). As such, the output of NOR gate 412 represents the EXOR function as the variable Z, where $$Z=(A1 \cdot E) \oplus (A2 \cdot E).$$

It is noted that FIG. 2B is the truth table for EXOR 200A and logic circuit 200C, and also for logic diagram 400A.

Figure 4B:
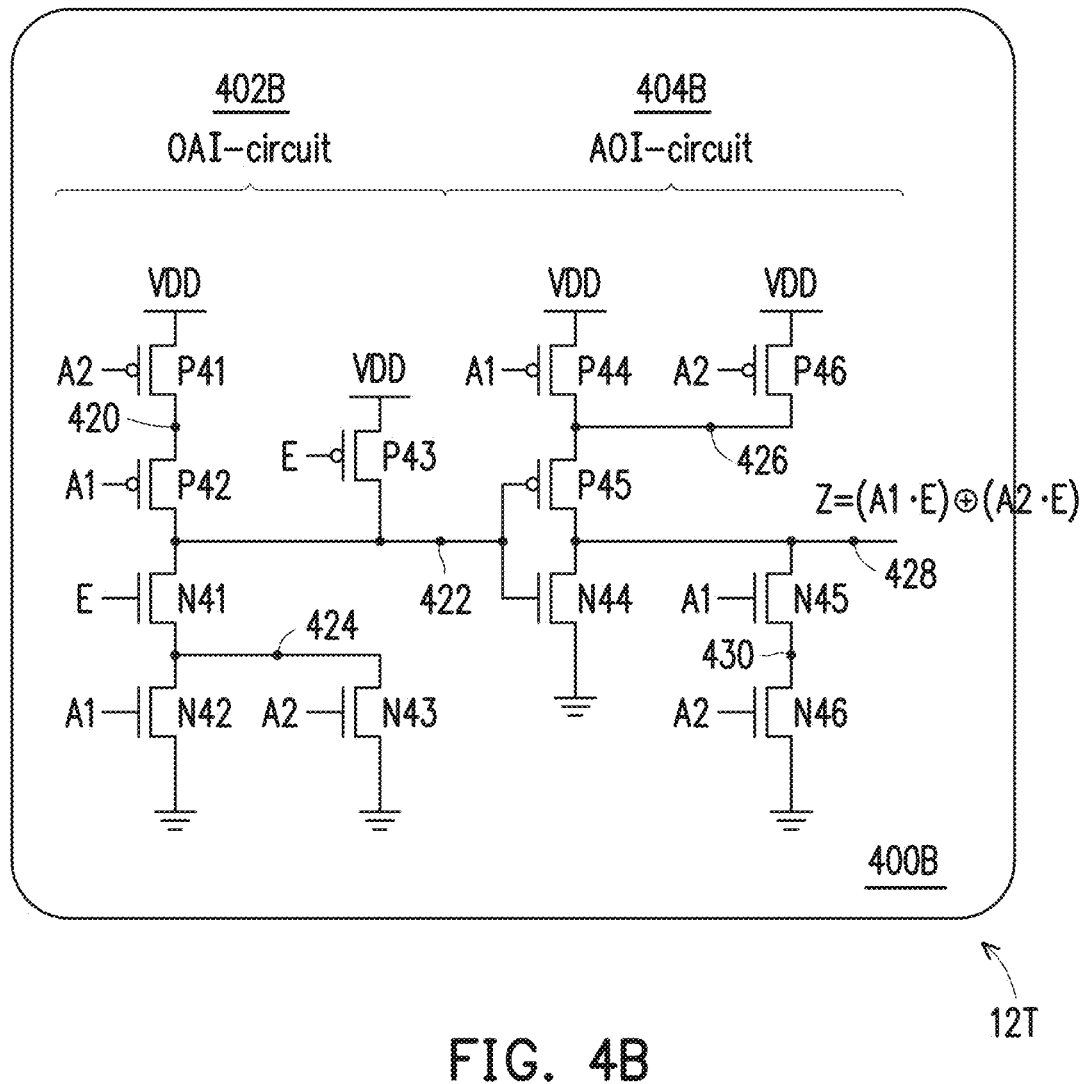
FIG. 4B is a schematic diagram of a logic circuit which provides an enable XOR (EXOR) function, in accordance with at least one embodiment of the present disclosure.

FIG. 4B is a schematic diagram of a logic circuit 400B which provides an enable XOR (EXOR) function, in accordance with at least one embodiment of the present disclosure. Logic circuit 400B is an example of EXOR circuit 104A of FIG. 1A. Logic circuit 400B is an example of circuit based on a layout diagram which includes a macro standard cell, where the macro standard cell results from method 110 of FIG. 1D.

In FIG. 4B, logic circuit 400B includes an OAI circuit 402B and an AOI circuit 404B. OAI circuit 402B is represented by a set of transistors which includes PMOS transistors P41-P43 and NMOS transistors N41-N43. AOI circuit 404B is represented by a set of transistors which includes PMOS transistors P44-P46 and NMOS transistors N44-N46. In FIG. 4B, logic circuit 400B is implemented with CMOS technology. In some embodiments, logic circuit 400B is implemented with technology other than CMOS technology.

In terms of arrangement, regarding OAI circuit 402B, transistor P41 is connected between a first reference voltage and a node 420. In FIG. 4B, the first reference voltage is VDD. In some embodiments, the first reference voltage is a voltage other than VDD. Transistor P42 is connected between node 420 and a node 422. Transistor P43 is connected between VDD and node 422. An output of OAI circuit 402B is provided on node 422. A signal on node 422 represents the logical function $\overline{(A1+A2) \cdot E}$. Transistor N41 is connected between node 422 and a node 424. Transistors N42 and N43 are connected in parallel between node 424 and VSS. A gate of each of the transistors P42 and N42 is configured to receive data signal A1. A gate of each of transistors P41 and N43 is configured to receive data signal A2. A gate of transistors P43 and N41 is configured to receive control signal E.

Also in terms of arrangement, regarding AOI circuit 404B, transistors P44 and P46 are connected between VDD and a node 426. Transistor P45 is connected between node 426 and a node 428. An output of AOI circuit 404B is provided on node 428. Transistor N44 is connected between node 428 and VSS. Transistor N45 is connected between node 428 and a node 430. Transistor N46 is connected between node 430 and VSS. A gate of each of transistors P44 and N45 is configured to data signal A1. A gate of transistors P46 and N46 is configured to receive data signal A2. A gate of each of transistors P45 and N44 is configured to receive the signal on node 422, where the signal on node 422 represents the output of OAI circuit 402B. A signal on node 428 represents the output of AOI circuit 404B, and thus the output of logic circuit 400B. The signal on node 428 represents the logical function $\overline{(A1 \cdot A2)+INPUT3}$, where INPUT3=$\overline{(A1+A2) \cdot E}$. Thus, the signal on node 428 represents the logical function of where Z=(A1•E)⊕(A2•E).

As shown in FIG. 4B, logic circuit 400B includes 12 transistors (12T). In some embodiments, logic circuit 400B is the result of applying a second level of switch minimization to the EXOR function, where the second level is more rigorous than the first level. Whereas the first level switch minimization of the EXOR function is implementable using the 18 transistors (18T) of logic circuit 200C of FIG. 2C, second level switch minimization of the EXOR function is implementable using the 12 transistors (12T) of logic diagram 400B of FIG. 4B. A decrease from 18T to 12T represents a 33% reduction in transistor count, and a reduction in area/footprint of about 38%. In some embodiments, as compared to the 24T implementation of EXOR 200A of FIG. 2A, the 12T implementation of logic circuit 400B consumes about 99% less power when control signal E has a logical zero state (E=0). In some embodiments, as compared to the 24T implementation of EXOR 200A of FIG. 2A, the 12T implementation of logic circuit 400B consumes about 46% less power when control signal E has a logical one state (E=1). In some embodiments, as compared to the 24T implementation of EXOR 200A of FIG. 2A, the 12T implementation of logic circuit 400B is about 12% faster in terms of signal propagation speed.

Logic circuit 400B has been optimized to exhibit a reduced area/footprint. With respect to an EXOR circuit (not shown) resulting from an ad hoc group corresponding to EXOR 200A, logic circuit 400B has a smaller area/footprint. In some embodiments, logic circuit 400B is optimized for a parameter other than area/footprint.

Figure 4C:
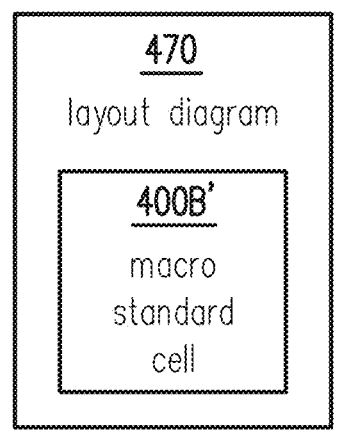
FIG. 4C is a layout diagram, in accordance with at least one embodiment of the present disclosure.

FIG. 4C is a layout diagram 470, in accordance with at least one embodiment of the present disclosure.

Layout diagram 470 includes a macro standard cell 400B', where macro standard cell 400B' corresponds to logic circuit 400B of FIG. 4B. In some embodiments, layout diagram 470 is generated, e.g., by EDA system 800 (see FIG. 8, discussed below) or design house 920 (see FIG. 9, discussed below). In some embodiments, macro standard cell 400B' is a standard cell included in set 826 of standard cells, where set 826 comprises a library 824 (see FIG. 8, discussed below).

Figure 5A:
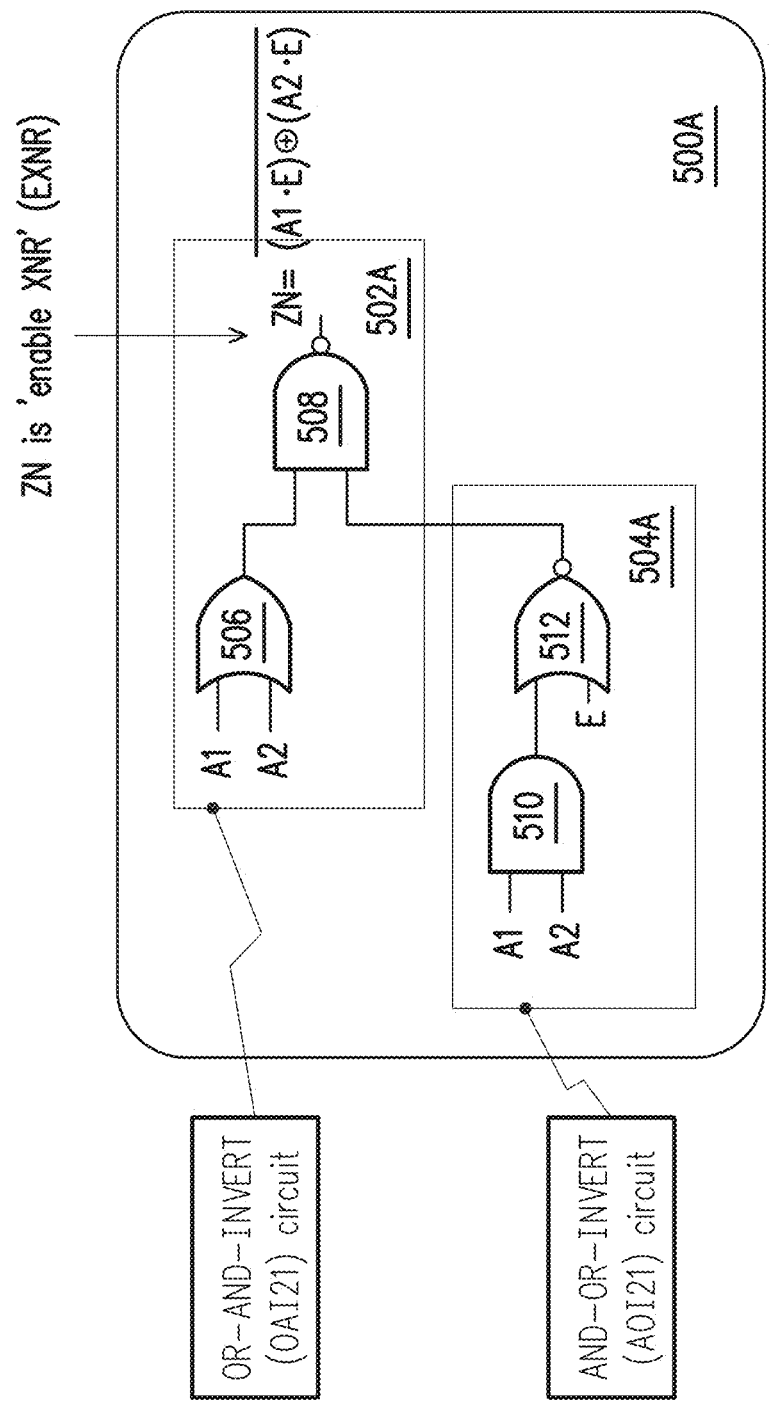
FIG. 5A is a logic diagram of an enable XNR (EXNR) function, in accordance with at least one embodiment of the present disclosure.

FIG. 5A is a logic diagram 500A of an enable XNR (EXNR) function, in accordance with at least one embodiment of the present disclosure. Logic diagram 500A is an example of a logic diagram corresponding to EXNR circuit 104B of FIG. 1B.

In FIG. 5A, logic diagram 500A includes: and an AND-OR-INVERT (AOI) logic diagram (AOI diagram) 504A and an OR-AND-INVERT (OAI) logic diagram (OAI diagram) 502A. Each of AOI diagram 504A and OAI diagram 502A has three inputs and one output. AOI diagram 504A is configured to receive a data signal A1, a data signal A2 and a control signal, enable signal E, as inputs. OAI diagram 502A is configured to receive data signals A1 and A2, and the output of AOI diagram 504A, as inputs. The output of logic diagram 500A is represented by the output of OAI diagram 502A.

AOI diagram 504A includes a two-input AND gate 510 and a two-input NOR gate 512. First and second inputs of AND gate 510 are configured to receive corresponding data signals A1 and A2. First and second inputs of NOR gate 512 are configured to receive correspondingly an output of AND gate 510 and control signal E. The output of AOI diagram 504A is provided at the output of NOR gate 512, and represents the logical function $\overline{(A1 \cdot A2) + E}$.

OAI diagram 502A includes a two-input OR gate 506 and a two-input NAND gate 508. First and second inputs of OR gate 506 are configured to receive corresponding data signals A1 and A2. First and second inputs of NAND gate 508 are configured to receive correspondingly an output of OR gate 506 and the output of AOI diagram 504A (the latter being represented by the output of NOR gate 512). The output of OAI diagram 502A is provided at the output of NAND gate 508, and represents the logical function $\overline{(A1 + A2)\mathrm{INPUT3}}$, where $\mathrm{INPUT3} = \overline{(A1 \cdot A2) + E}$.

The output of logic diagram 500A is represented by the output of OAI diagram 502A (the latter being represented by the output of NAND gate 508). As such, the output of NAND gate 508 represents the EXNR function as the variable ZN, where $$ZN = \overline{(A1 \cdot E) \oplus (A2 \cdot E)}.$$

It is noted that FIG. 3B is the truth table for EXNR 300A and logic circuit 300C, and also for logic diagram 500A.

Figure 5B:
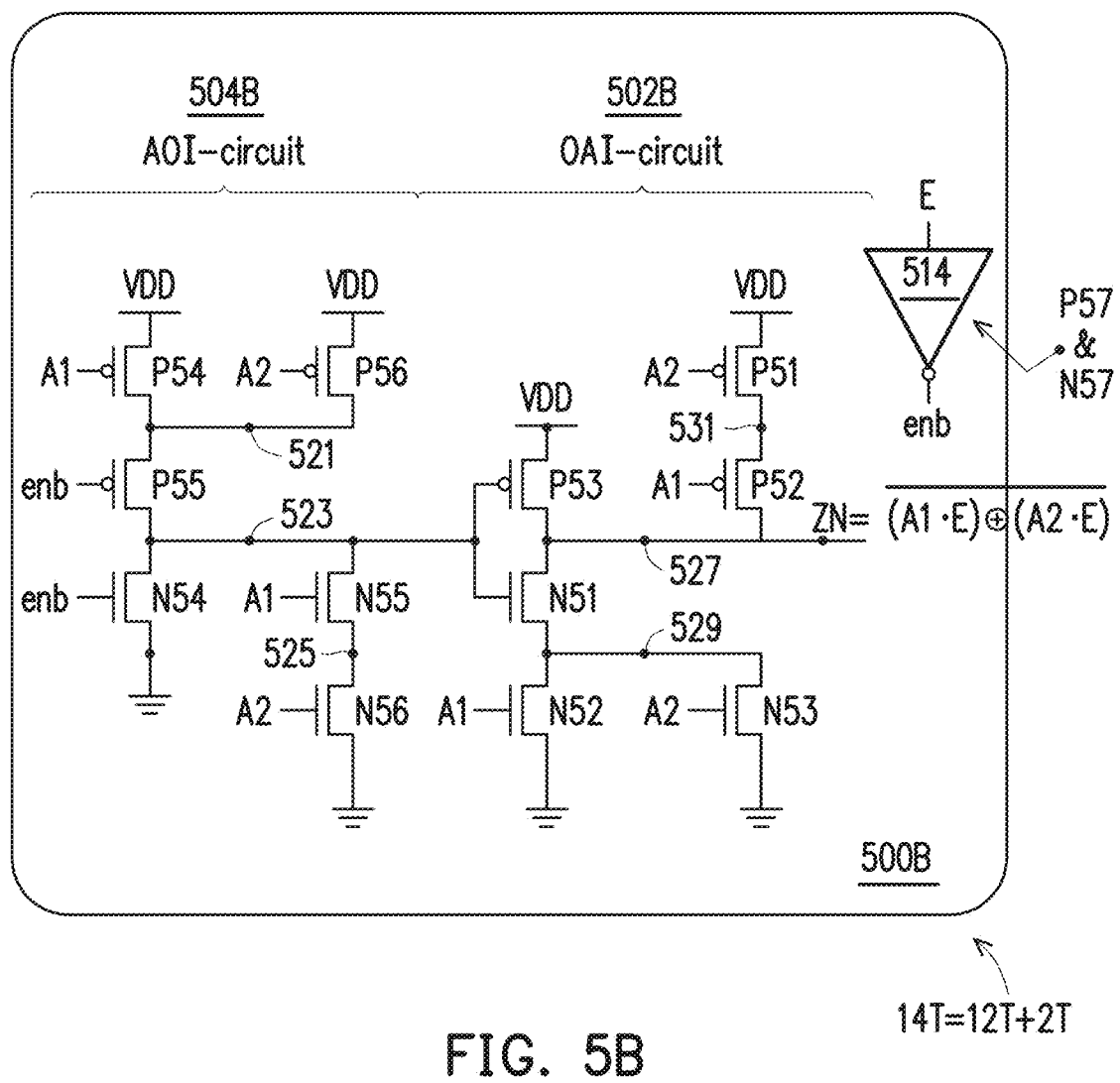
FIG. 5B is a schematic diagram of a logic circuit which provides an enable XNR (EXNR) function, in accordance with at least one embodiment of the present disclosure.

FIG. 5B is a schematic diagram of a logic circuit 500B which provides an enable XNR (EXNR) function, in accordance with at least one embodiment of the present disclosure. Logic circuit 500B is an example of EXNR circuit 104B of FIG. 1B. Logic circuit 500B is an example of circuit based on a layout diagram which includes a macro standard cell, where the macro standard cell results from method 110 of FIG. 1D.

In FIG. 5B, logic circuit 500B includes an AOI circuit 504B, an OAI circuit 502B and an inverter 514. AOI circuit 504B is represented by a set of transistors which includes PMOS transistors P54-P56 and NMOS transistors N54-N56. OAI circuit 502B is represented by a set of transistors which includes PMOS transistors P51-P53 and NMOS transistors N51-N53. Inverter 514 is represented by a set of transistors which includes PMOS transistor P57 (not shown) and NMOS transistor N57 (not shown). In FIG. 5B, logic circuit 500B is implemented with CMOS technology. In some embodiments, logic circuit 500B is implemented with technology other than CMOS technology.

In terms of arrangement, the input of inverter 514 is configured to receive control signal E. A signal on the output of inverter 514 represents the logical function $\overline{E} = \mathrm{enb}$. Regarding AOI circuit 504B, transistors P54 and P56 are connected between a first reference voltage and a node 521. In FIG. 5B, the first reference voltage is VDD. In some embodiments, the first reference voltage is a voltage other than VDD. Transistor P55 is connected between node 521 and a node 523. An output of AOI circuit 504B is provided on node 523. Transistor N54 is connected between node 523 and a second reference voltage. In FIG. 5B, the second reference voltage is VSS. In some embodiments, the second reference voltage is a voltage other than VSS. Transistor N55 is connected between node 523 and a node 525. Transistor N56 is connected between node 525 and VSS. A signal on node 523 represents the output of AOI circuit 504B.

A gate of each of transistors P54 and N55 is configured to receive data signal A1. A gate of transistors P56 and N56 is configured to receive data signal A2. A gate of each of transistors P55 and N54 is configured to receive the signal enb on the output of inverter 514. The signal on node 523 represents the logical function $\overline{(A1 \cdot A2) + \mathrm{enb}}$.

Also in terms of arrangement, regarding OAI circuit 502B, transistor P51 is connected between VDD and a node 531. Transistor P52 is connected between node 531 and a node 527. Transistor P53 is connected between VDD and node 527. An output of OAI circuit 502B is provided on node 527. Transistor N51 is connected between node 527 and a node 529. Transistors N52 and N53 are connected in parallel between node 529 and VSS. A gate of each of the transistors P52 and N52 is configured to receive data signal A1. A gate of each of transistors P51 and N53 is configured to receive data signal A2. A gate of transistors P53 and N51 is configured to receive the signal on node 523, where the signal on node 523 represents the logical function represents the logical function $\overline{(A1 \cdot A2) + \mathrm{enb}}$. A signal on node 527 represents the logical function $\overline{(A1 + A2)\mathrm{INPUT3}}$, where $\mathrm{INPUT3} = \overline{(A1 \cdot A2) + \mathrm{enb}} = \overline{(A1 \cdot A2) + E}$. Thus, the signal on node 527 represents the logical function of where $ZN = \overline{(A1 \cdot E) \oplus (A2 \cdot E)}$.

As shown in FIG. 5B, logic circuit 500B includes 14 transistors (14T=12T+2T). In some embodiments, logic circuit 500B is the result of applying a second level of switch minimization to the EXNR function, where the second level is more rigorous than the first level. Whereas the first level switch minimization of the EXNR function is implementable using the 18 transistors (18T) of logic circuit 300C of FIG. 3C, second level switch minimization of the EXNR function is implementable using the 14 transistors (14T) of logic diagram 500B of FIG. 5B. A decrease from 18T to 14T represents a 22% reduction in transistor count, and a reduction in area/footprint of about 33%. In some embodiments, as compared to the 24T implementation of EXNR 300A of FIG. 3A, the 14T implementation of logic circuit 500B consumes about 99% less power when control signal E has a logical zero state (E=0). In some embodiments, as compared to the 24T implementation of EXNR 300A of FIG. 3A, the 14T implementation of logic circuit 500B consumes about 45% less power when control signal E has a logical one state (E=1). In some embodiments, as compared to the 24T implementation of EXNR 300A of FIG. 3A, the 12T implementation of logic circuit 500B is about 11% faster in terms of signal propagation speed.

Logic circuit 500B has been optimized to exhibit a reduced area/footprint. With respect to an EXNR circuit (not shown) resulting from an ad hoc group corresponding to EXNR 300A, logic circuit 400B has a smaller area/footprint. In some embodiments, logic circuit 400B is optimized for a parameter other than area/footprint.

Figure 5C:
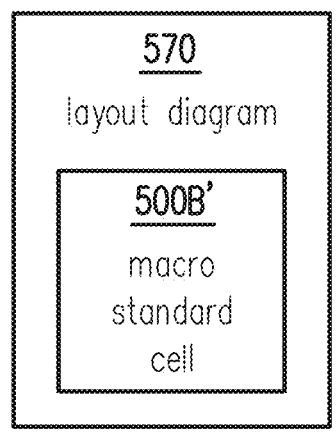
FIG. 5C is a layout diagram, in accordance with at least one embodiment of the present disclosure.

FIG. 5C is a layout diagram 570, in accordance with at least one embodiment of the present disclosure.

Layout diagram 570 includes a macro standard cell 500B', where macro standard cell 500B' corresponds to logic circuit 500B of FIG. 5B. In some embodiments, layout diagram 570 is generated, e.g., by EDA system 800 (see FIG. 8, discussed below) or design house 920 (see FIG. 9, discussed below). In some embodiments, macro standard cell 500B' is a standard cell included in set 826 of standard cells, where set 826 comprises a library 824 (see FIG. 8, discussed below).

Figure 6A:
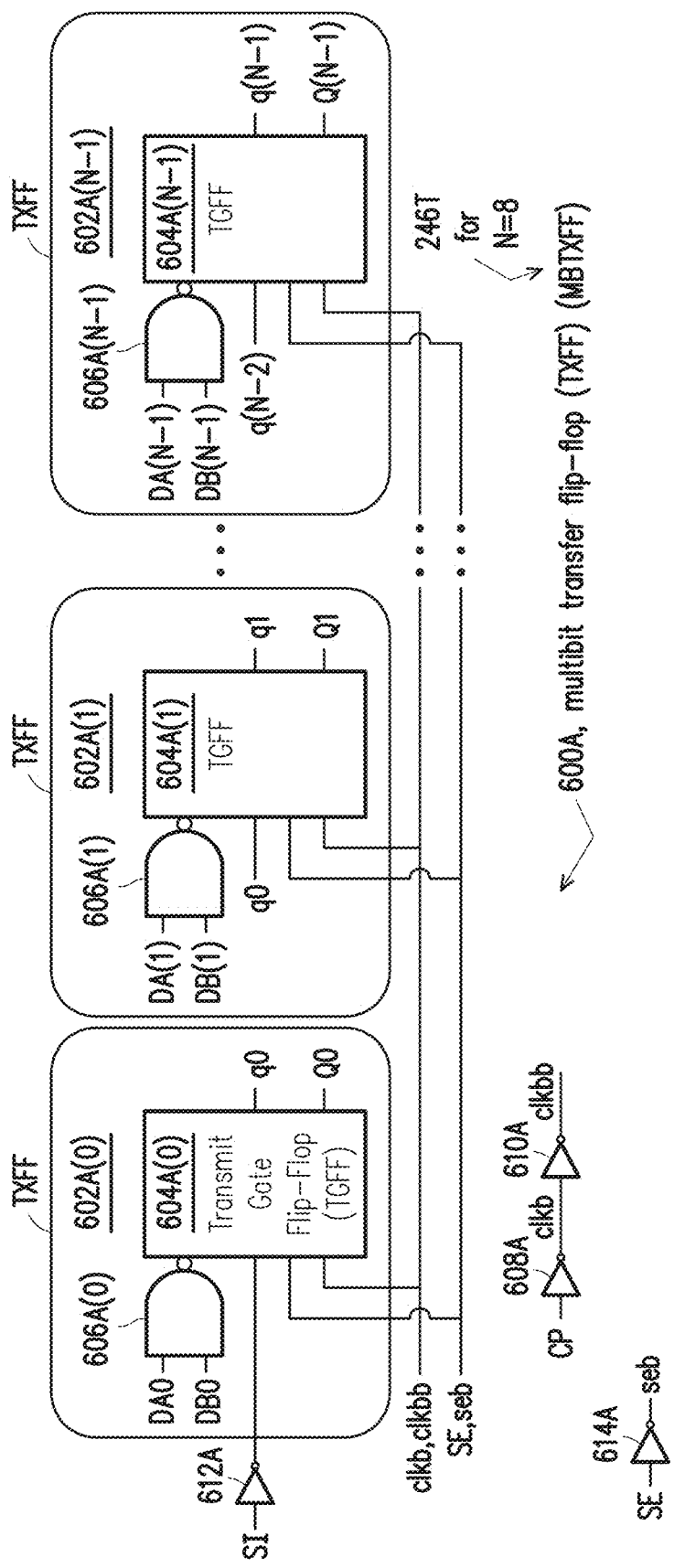
FIG. 6A is a logic diagram of an N-bit multibit transfer flip-flop (TXFF) (MBTXFF) function, in accordance with at least one embodiment of the present disclosure.

FIG. 6A is a logic diagram 600A of an N-bit multibit transfer flip-flop (TXFF) (MBTXFF) function, in accordance with at least one embodiment of the present disclosure. Logic diagram 600A is an example of a logic diagram corresponding to N-bit MBFF circuit 104C of FIG. 1C.

Logic diagram 600A of FIG. 6A includes inverters 608A, 610A, 612A and 614A, NAND gates 606A(0), 606A(1), . . . , 606A(N-1), and 1 bit transfer flip-flops (TXFFs), TXFF 602A(0), TXFF 602A(1), . . . , TXFF 602A(N-1), where N is a positive integer and 2≤N. In some embodiments, N=8.

In FIG. 6A, inverter 608A is configured to receive a clock pulse/signal CP and output a clock_bar signal clkb=$\overline{CP}$. Inverter 610A is configured to receive clock_bar signal clkb=$\overline{CP}$ and output a clock_bar_bar signal clkbb=$\overline{(CP)}$. Inverter 612A is configured to receive a start signal SI and output a start_bar signal SI_bar=SIb=$\overline{SI}$. Inverter 614A is configured to receive a switch-enable signal SE and output a switch-enable_bar signal SE_bar=$\overline{SE}$. The i$^{th}$ instance of the 1 bit TXFF, TXFF 602A(i), is configured to output signals Q(i) and q(i). Signal Q(i) represents the primary output of the 1 bit TXFF, and is the inverse of the signal on node 658 (see FIG. 6C). Signal q(i) is based partially on the inverse of the signal on node 658 and partially on the output of SGL circuit 620(*i*). Signal q(i) is used for internal scan-chain purposes as the input si(i+1) to the (i+1)$^{th}$ instance of the 1 bit TXFF such that q(i)=si(i+1), e.g., the input si for TXFF 602A(1) is q(0), the input si for TXFF 602A is q(N-2), or the like. TXFF 602A(i) is configured to receive, as inputs, data signals DA(i) and DB(i), clock_bar signal clkb, clock_bar_bar signal clkbb, switch-enable signal SE, switch-enable_bar signal SE_bar, an output from the i$^{th}$ NAND circuit 606A(i), a signal q(i−1) from (i−1)$^{th}$ TXFF 606A(i-1), the clock_bar signal, the clock_bar_bar signal, the control signal and the control_bar signal. A zeroth ((0)th) one of N transfer the TXFF circuit, TXFF 602A(0), is configured to receive the start_bar signal Si_bar=$\overline{Si}$ in place of the signal q(i−1).

FIG. 6B is a truth table for the N-bit multibit TXFF (MBTXFF) function of logic diagram 600A, in accordance with at least one embodiment of the present disclosure.

In the truth table of FIG. 6B: the symbol, ↗, indicates a rising edge as the active edge of the clock/pulse signal CP; and the symbol, X, indicates that that the logical value is either logical zero (0) or logical one (1). In the columns labeled "Q(0)" and "Q(i)", the values shown in rows 10-11 are Q(0)(row10)=Q(0)(row11)="Q(0)" and Q(i)(row10)=Q(i)(row11)="Q(i)", which indicates that Q should be frozen when CP does not transfer at either CP=0 or CP=1

Figure 6C:
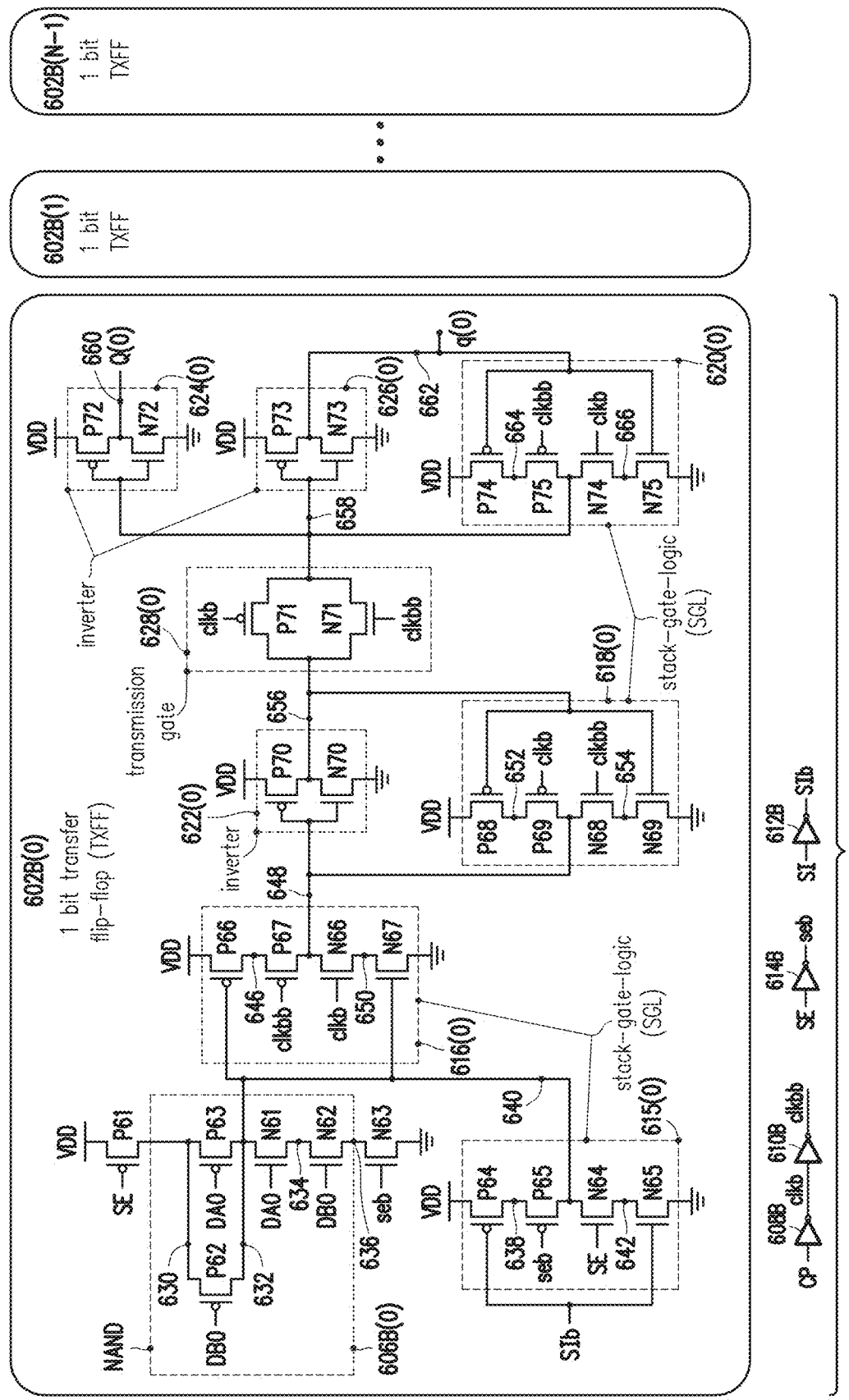
FIG. 6C is a schematic diagram of an N-bit multibit (TXFF) (MBTXFF) circuit 600C, in accordance with at least one embodiment of the present disclosure.

FIG. 6C is a schematic diagram of an N-bit multibit (TXFF) (MBTXFF) circuit 600C, in accordance with at least one embodiment of the present disclosure. MBTXFF circuit 600C is an example of N-bit MBFF circuit 104C of FIG. 1C. MBTXFF circuit 600C is an example of circuit based on a layout diagram which includes instances of a macro standard cell, where the macro standard cell results from method 110 of FIG. 1D.

In FIG. 6C, MBTXFF circuit 600C includes: a two input NAND circuit 606B(0); inverters 608B, 610B, 612B and 614B; stack-gate-logic (SGL) circuits 615(0), 616(0), 618 (0) and 620(0); inverters 622(0), 624(0) and 626(0); and a transmission gate 628.

In terms of arrangement, first and second inputs of NAND circuit 606B(0) are configured to receive corresponding data signals DA(i) and DB(i). An input of SGL circuit 615(0) is configured to receive control_bar signal seb. Outputs of each of NAND circuit 606B(0) and SGL circuit (615(0) are connected to a node 640. An input of SGL circuit 616(0) is connected to node 640. An output of SGL circuit 616(0) is connected to a node 648. Inputs of each of SGL circuit 618(0) and inverter 622(0) are connected to node 648. Outputs of each of SGL circuit 618(0) and inverter 622(0) are connected to a node 656. An input of transmission gate 628(0) is connected to node 656. An output of transmission gate 628(0) is connected to a node 658. The input of each of SGL circuit 620(0), inverter 624(0) and inverter 626(0) are connected to node 658. An output of inverter 624(0) is connected to a node 660. A signal on node 660 represents signal Q(0), which is a first output of a logic circuit referred to as TXFF circuit (602B(0)). An output of each of SGL circuit 620(0) and inverter 626(0) are connected to a node 662. A signal on node 662 represents signal q(0), which is a second output of TXFF circuit (602B(0)).

In terms of transistors, NAND circuit 606B(0) is represented by a set of transistors which includes PMOS transistors P62-P63 and NMOS transistors N62-N63.

SGL circuit 615(0) is represented by a set of transistors which includes PMOS transistors P64-P65 and NMOS transistors N64-N65. SGL circuit 616(0) is represented by a set of transistors which includes PMOS transistors P66-P67 and NMOS transistors N66-N67. SGL circuit 618(0) is represented by a set of transistors which includes PMOS transistors P68-P69 and NMOS transistors N68-N69. Inverter 622(0) is represented by a set of transistors which includes PMOS transistor P70 and NMOS transistor N70. Transmission gate 628(0) is represented by a set of transistors which includes PMOS transistor P71 and NMOS transistor N71. Inverter 624(0) is represented by a set of transistors which includes PMOS transistor P72 and NMOS transistor N72. Inverter 626(0) is represented by a set of transistors which includes PMOS transistor P73 and NMOS transistor N73. SGL circuit 620(0) is represented by a set of transistors which includes PMOS transistors P74-P75 and NMOS transistors N74-N75.

In terms of arrangement, a PMOS transistor P61, as a control switch, is connected between a first reference voltage and a node 630. In FIG. 6C, the first reference voltage is VDD. In some embodiments, the first reference voltage is a voltage other than VDD. Regarding NAND circuit 606B(0), transistors P62 and P63 are connected in parallel between node 630 and a node 632. An output of NAND circuit 606B(0) is provided on node 632. A signal on node 632 represents the logical function $\overline{DB0 \cdot DA0}$. Transistor N61 is connected between node 632 and a node 634. Transistor N62 is connected between node 634 and a node 636. An NMOS transistor N63, as a control switch, is connected between node 636 and a second reference voltage. In FIG. 6C, the second reference voltage is VSS. In some embodiments. the second reference voltage is a voltage other than VSS. A gate electrode of transistor P61 is configured to receive switch-enable signal SE. A gate electrode of transistor N63 is configured to receive switch-enable_bar signal SE_bar=$\overline{SE}$. Gate electrodes of each of transistors P63 and N61 are configured to receive data signal DA0. Gate electrodes of transistors P62 and N62 are configured to receive Data signal DB0.

In terms of arrangement, regarding SGL circuit 615(0), transistor P64 is connected between VDD and a node 638. Transistor P65 is connected between node 638 and node 640. Transistor N64 is connected between node 640 and a node 642. Transistor N65 is connected between node 642 and VSS. Gate electrodes of each of transistors P64 and N65 are configured to receive the start_bar scan-input_bar signal SI_bar. A gate electrode of transistor P65 is configured to receive switch-enable_bar signal SE_bar=A gate electrode of transistor N64 is configured to receive switch-enable signal SE.

In terms of arrangement, regarding SGL circuit 616(0), transistor P66 is connected between VDD and a node 646. Transistor P67 is connected between node 646 and node 648. Transistor N66 is connected between node 648 and a node 650. Transistor N67 is connected between node 650 and VSS. Gate electrodes of each of transistors P66 and N67 are configured to receive a signal on node 640. A gate electrode of transistor P67 is configured to receive clock_bar_bar signal clkbb=$\overline{(CP)}$. A gate electrode of transistor N66 is configured to receive clock_bar signal clkb=$\overline{CP}$.

In terms of arrangement, regarding SGL circuit 618(0), transistor P68 is connected between VDD and a node 652. Transistor P69 is connected between node 652 and node 648. Transistor N68 is connected between node 648 and a node 654. Transistor N69 is connected between node 654 and VSS. Gate electrodes of each of transistors P68 and N69 are configured to receive a signal on node 656. A gate electrode of transistor P69 is configured to receive clock_bar signal clkb=$\overline{CP}$. A gate electrode of transistor N68 is configured to receive clock_bar_bar signal clkbb=$\overline{(CP)}$.

In terms of arrangement, regarding inverter 622(0), transistor P70 is connected between VDD and node 656. Transistor N70 is connected between node 656 and VSS. Gate electrodes of each of transistors P70 and N70 are configured to receive a signal on node 656. An output of inverter 622(0) is connected to node 656.

In terms of arrangement, regarding transmission gate 628(0), transistors P71 and N71 are connected in parallel between node 656 and node 658. A gate electrode of transistor P71 is configured to receive clock_bar signal clkb=$\overline{CP}$. A gate electrode of transistor N71 is configured to receive clock_bar_bar signal clkbb=$\overline{(CP)}$.

In terms of arrangement, regarding inverter 624(0), transistor P72 is connected between VDD and node 660. Transistor N72 is connected between node 660 and VSS. Gate electrodes of each of transistors P72 and N72 are configured to receive a signal on node 658. An output of inverter 624(0) is connected to node 660. A signal on node 660, again, represents signal Q(0), which is the first output of TXFF circuit (602B(0)).

In terms of arrangement, regarding inverter 626(0), transistor P73 is connected between VDD and node 662. Transistor N73 is connected between node 662 and VSS. Gate electrodes of each of transistors P73 and N73 are configured to receive the signal on node 658. An output of inverter 626(0) is connected to node 662. A signal on node 662, again, represents signal q(0), which is the second output of TXFF circuit (602B(0)).

In terms of arrangement, regarding SGL circuit 620(0), transistor P74 is connected between VDD and a node 664. Transistor P75 is connected between node 664 and node 658. Transistor N74 is connected between node 658 and a node 666. Transistor N75 is connected between node 666 and VSS. Gate electrodes of each of transistors P74 and N75 are configured to receive the signal on node 662. A gate electrode of transistor P75 is configured to receive clock_bar_bar signal clkbb=$\overline{(CP)}$. A gate electrode of transistor N74 is configured to receive clock_bar signal clkb=$\overline{CP}$.

In FIG. 6C, MBTXFF circuit 600C is implemented with CMOS technology. In some embodiments, MBTXFF circuit 600C is implemented with technology other than CMOS technology.

In some embodiments, N=8 such that MBTXFF circuit 600C of FIG. 6C includes: inverters 608B, 610B, 612B and 614B; NAND gates 606B(0), 606B(1), ..., 606B(7), and TXFF circuits, TXFF 602B(0), TXFF 602B(1), ..., TXFF 602B(7). According to another approach, for N=8, a MBTXFF circuit (not shown) is implementable using the 262 transistors (262T), MBTXFF circuit 600C of FIG. 6C for which N=8 is implementable using 262 transistors (262T). In some embodiments, where N=8, MBTXFF circuit 600C of FIG. 6C is implementable using 248 transistors (248T). A decrease from 262T to 248T represents a reduction of about 5% in transistor count, and a reduction in area/footprint of about 13%. In some embodiments, as compared to the 262T implementation of the other approach, the 248T implementation of MBTXFF circuit 600C of FIG. 6C consumes about 5% less power. In some embodiments, as compared to the 262T implementation of the other approach, the 248T implementation of MBTXFF circuit 600C of FIG. 6C is about 23% faster in terms of signal propagation speed.

Figure 6D:
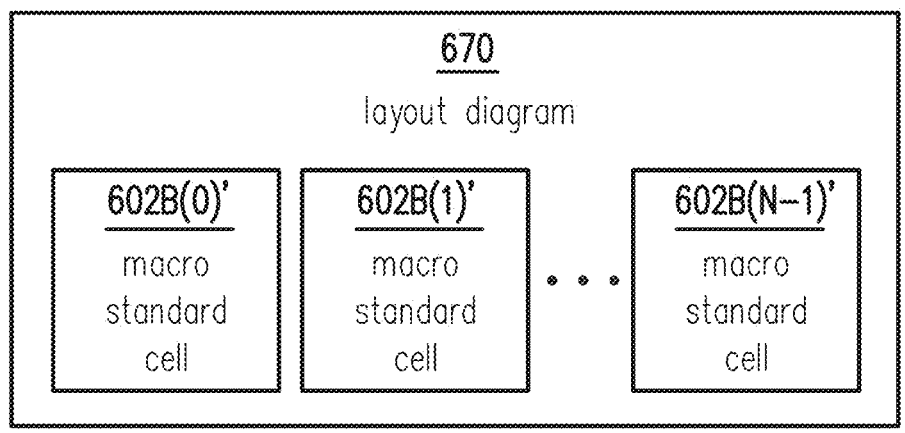
FIG. 6D is a layout diagram, in accordance with at least one embodiment of the present disclosure.

FIG. 6D is a layout diagram 670, in accordance with at least one embodiment of the present disclosure.

Layout diagram 670 includes a macro standard cells 602B(0)', 602B(1)', 602B(N-1), where macro standard cells 602B(0)', 602B(1)', 602B(N-1)' correspond to TXFF circuits 602B(0), 602B(1), 602B(N-1)' of FIG. 6C. In some embodiments, layout diagram 570 is generated, e.g., by EDA system 800 (see FIG. 8, discussed below) or design house 920 (see FIG. 9, discussed below). In some embodiments, each of macro standard cells 602B(0)', 602B(1)', ..., 602B(N-1) is an instance of a standard cell included in set 826 of standard cells, where set 826 comprises a library 824 (see FIG. 8, discussed below).

Figure 7:
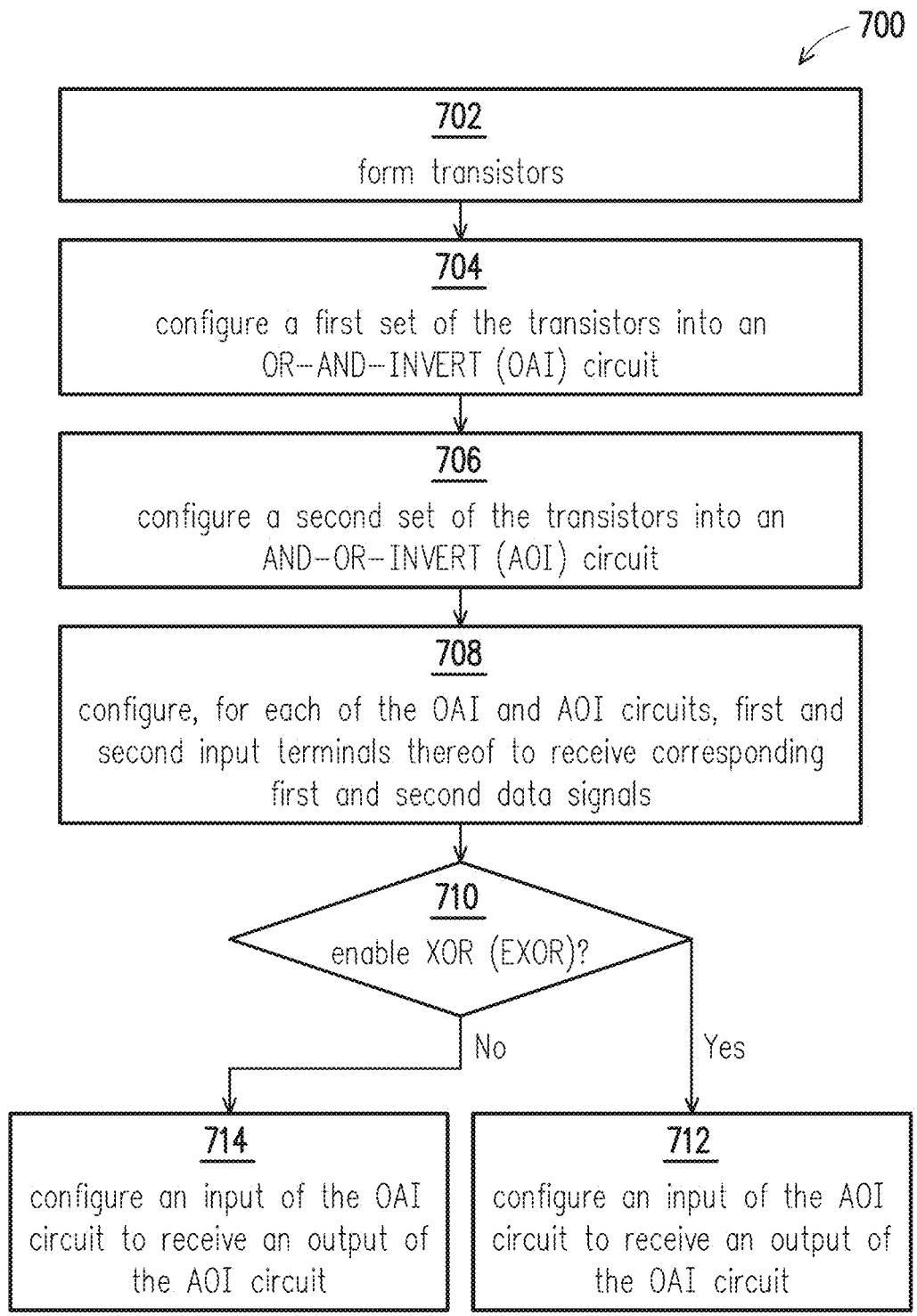
FIG. 7 is a flowchart of a method 700 of forming a logic circuit, in accordance with at least one embodiment of the present disclosure.

FIG. 7 is a flowchart of a method 700 of forming a logic circuit, in accordance with at least one embodiment of the present disclosure.

Examples of logic circuits which result from method 700 include macro 102A of semiconductor device 100A of FIG. 1A, macro 102B of semiconductor device 100B of FIG. 1B, logic circuit 300C of FIG. 3C, logic circuit 400B of FIG. 4B, or the like.

In FIG. 7, method 700 includes blocks 702-714. At block 702, transistors are formed. From block 702, flow proceeds to block 704. At block 704, a first set of the transistors is configured into an OR-AND-INVERT (OAI) circuit. Examples of the OAI circuit include OAI circuits 402B, 502B, or the like. From block 704, flow proceeds to block 706. At block 706, a second set of the transistors is configured into an AND-OR-INVERT (AOI) circuit. Examples of the AOI circuit include AOI circuits 404B, 504B, or the like. From block 706, flow proceeds to block 708. At block 708, for each of the OAI and AOI circuits, first and second input terminals thereof are configured to receive corresponding first and second data signals. Examples of the first and second data signals are corresponding data signals A1 and A2 of FIGS. 4A, 4C, 5A and 5C. From block 708, flow proceeds to block 710.

At block 710, it is determined if the logic circuit is to provide an enable XOR (EXOR) function. If the outcome of block 710 is positive (EXOR is intended), then flow proceeds to block 712, where an input of the AOI circuit is configured to receive an output of the OAI circuit. If the outcome of block 710 is negative (EXNR is intended), then flow proceeds to block 714. At block 714, an input of the OAI circuit is configured to receive an output of the AOI circuit.

Figure 8:
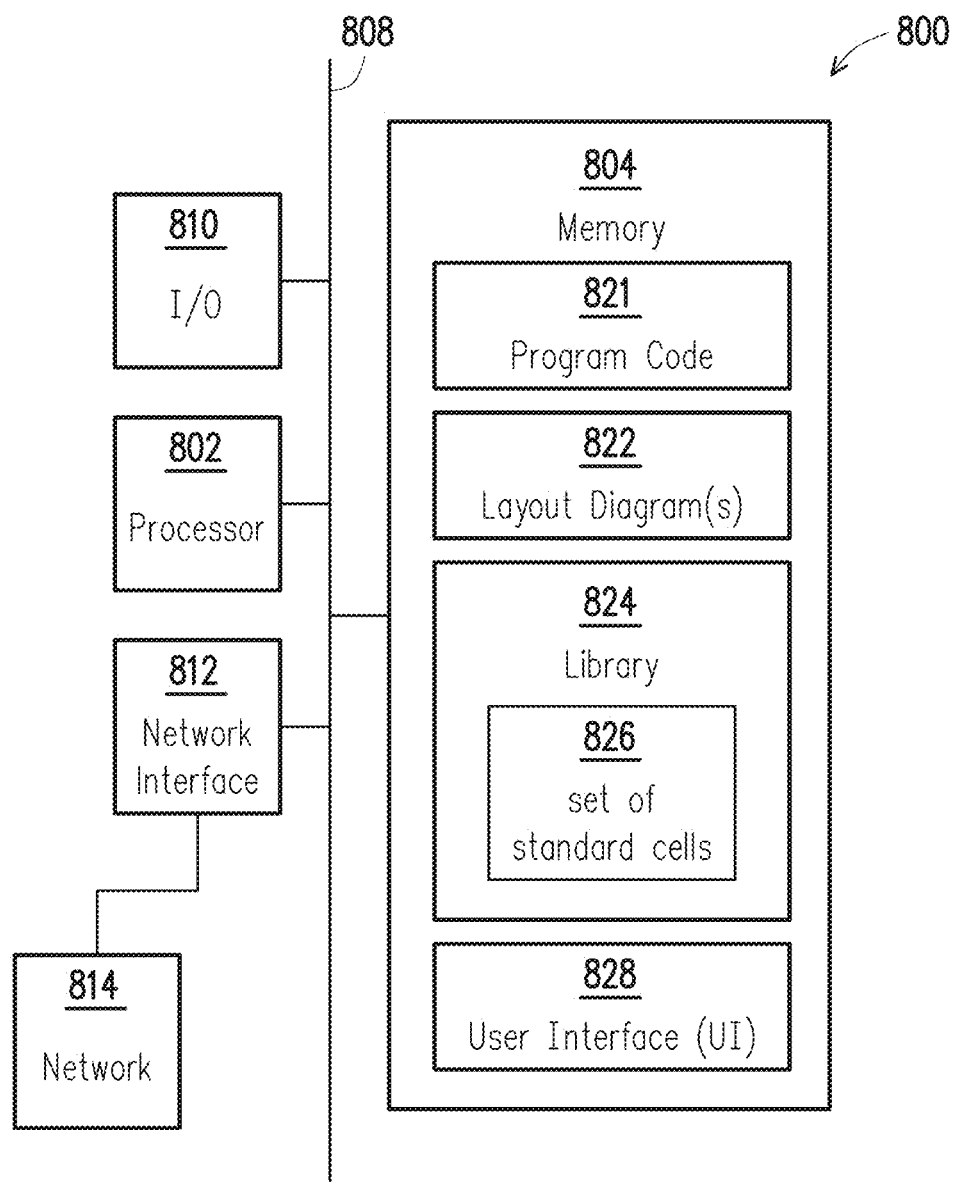
FIG. 8 is a block diagram of an electronic design automation (EDA) system, in accordance with at least one embodiment of the present disclosure.

FIG. 8 is a block diagram of an electronic design automation (EDA) system, in accordance with at least one embodiment of the present disclosure.

FIG. 8 is a block diagram of an electronic design automation (EDA) system 800, in accordance with at least one embodiment of the present disclosure.

In some embodiments, EDA system 800 includes an automatic placement and routing (APR) system. The method of the flowchart of FIG. 4 is implemented, for example, using EDA system 800, in accordance with some embodiments.

In some embodiments, EDA system 800 is a general purpose computing device including a hardware processor 802 and a non-transitory, computer-readable storage medium 804. Storage medium 804, amongst other things, includes, i.e., stores, computer program code 821, i.e., a set of executable instructions. Execution of program code 821 by hardware processor 802 represents (at least in part) an EDA tool which implements a portion or all of, e.g., the method of FIG. 4, in accordance with one or more embodiments (hereinafter, the noted process and/or method).

Processor 802 is electrically coupled to storage medium 804 via a bus 805. Storage medium 804 is an example of a computer-readable medium. Processor 802 is also electrically coupled to an I/O interface 810 by bus 808. A network interface 812 is also electrically connected to processor 802 via bus 808. Network interface 812 is connected to a network 814, so that processor 802 and storage medium 804 are capable of connecting to external elements via network 814. Processor 802 is configured to execute computer program code 821 encoded in storage medium 804 in order to cause system 800 to be usable for performing a portion or all of the noted process and/or method. Storage medium 804 also includes one or more layout diagrams 822 generated according to a portion or all of the noted process and/or method. In one or more embodiments, processor 802 is a central processing unit (CPU), a multi-processor, a distributed processing system, an application specific integrated circuit (ASIC), and/or a suitable processing unit.

In one or more embodiments, storage medium 804 is an electronic, magnetic, optical, electromagnetic, infrared, and/or a semiconductor system (or apparatus or device). For example, storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks storage medium 804 includes a compact disk-read only memory (CD-ROM), a compact disk-read/write (CD-R/W), and/or a digital video disc (DVD).

In one or more embodiments, storage medium 804 includes computer program code 821 configured to cause system 800 (where such execution represents (at least in part) the EDA tool) to be usable for performing a portion or all of the noted processes and/or methods. In one or more embodiments, storage medium 804 also includes information which facilitates performing a portion or all of the noted processes and/or methods. In one or more embodiments, storage medium 804 includes a library 824 which comprises a set 826 of standard cells.

EDA system 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

Again, EDA system 800 includes network interface 812. Network interface 812 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted process and/or method, is implemented in two or more systems 800.

System 800 is configured to receive information through I/O interface 810. The information received through I/O interface 810 includes one or more of computer program code, data, design rules, libraries of standard cells, and/or other parameters for processing by processor 802. The information is transferred to processor 802 via bus 808. EDA system 800 is configured to receive information related to a UI through I/O interface 810. The information is included in computer-readable medium 804 as user interface (UI) 828.

In some embodiments, a portion or all of the noted process and/or method is implemented as a standalone software application for execution by a processor. In some embodiments, a portion or all of the noted process and/or method is implemented as a software application that is a part of an additional software application. In some embodiments, a portion or all of the noted process and/or method is implemented as a plug-in to a software application. In some embodiments, at least one of the noted process and/or method is implemented as a software application that is a portion of an EDA tool. In some embodiments, a portion or all of the noted process and/or method is implemented as a software application that is used by EDA system 800. In some embodiments, a layout diagram is generated using a tool such as VIRTUOSO® available from CADENCE DESIGN SYSTEMS, Inc., or another suitable layout diagram generating tool.

In some embodiments, the processes are realized as functions of a program included in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 9:
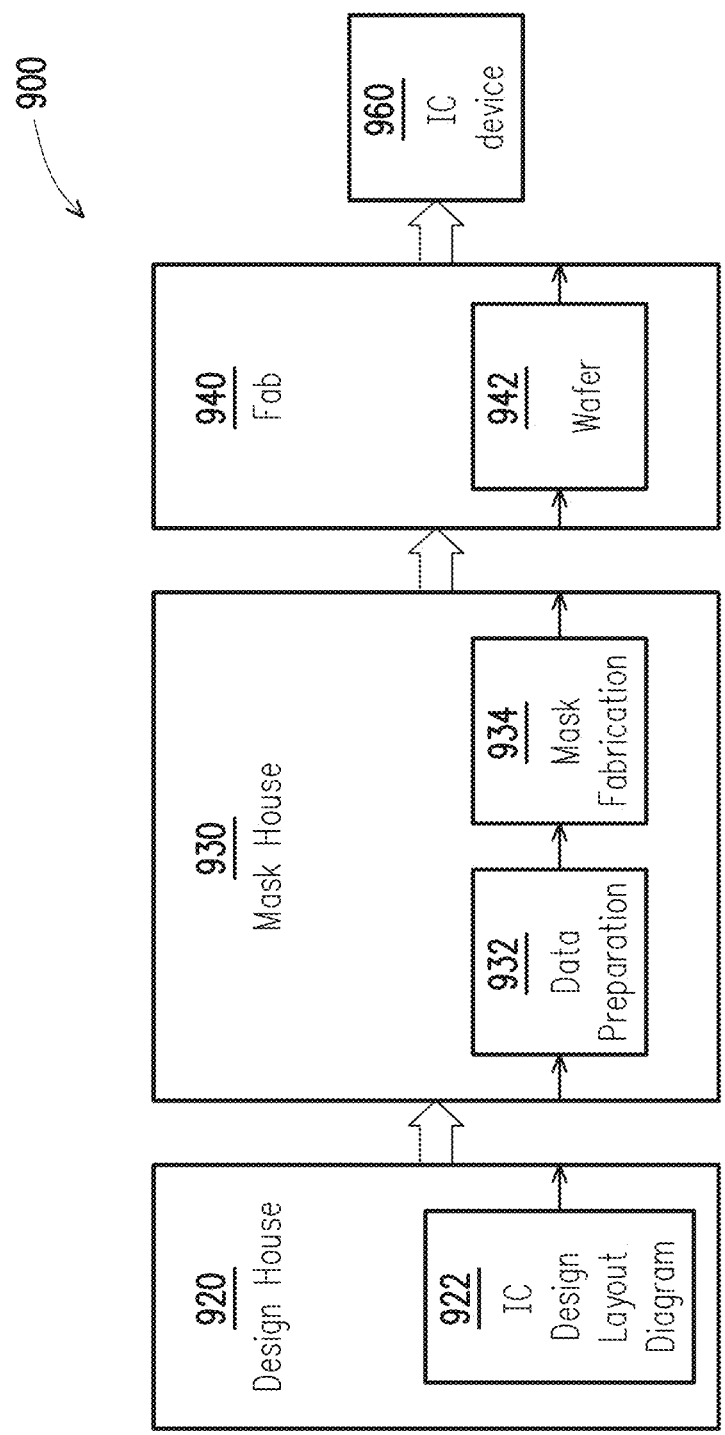
FIG. 9 is a block diagram of an integrated circuit (IC) manufacturing system, and an IC manufacturing flow associated therewith, in accordance with at least one embodiment of the present disclosure.

FIG. 9 is a block diagram of an integrated circuit (IC) manufacturing system 900, and an IC manufacturing flow associated therewith, in accordance with at least one embodiment of the present disclosure.

In FIG. 9, IC manufacturing system 900 includes entities, such as a design house 920, a mask house 930, and an IC manufacturer/fabricator ("fab") 940, that interact with one another in the design, development, and manufacturing cycles and/or services related to manufacturing an IC device 960. The entities in system 900 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 920, mask house 930, and IC fab 940 is owned by a single larger company. In some embodiments, two or more of design house 920, mask house 930, and IC fab 940 coexist in a common facility and use common resources.

Design house (or design team) 920 generates an IC design layout diagram 922. IC design layout diagram 922 includes various geometrical patterns designed for an IC device 960. The geometrical patterns correspond to patterns of metal, oxide, or semiconductor layers that make up the various components of IC device 960 to be fabricated. The various layers combine to form various IC features. For example, a portion of IC design layout diagram 922 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 920 implements a proper design procedure to form IC design layout diagram 922. The design procedure includes one or more of logic design, physical design or place and route. IC design layout diagram 922 is presented in one or more data files having information of the geometrical patterns. For example, IC design layout diagram 922 can be expressed in a GDSII file format or DFII file format.

Mask house 930 includes mask data preparation 932 and mask fabrication 934. Mask house 930 uses IC design layout diagram 922 to manufacture one or more masks to be used for fabricating the various layers of IC device 960 according to IC design layout diagram 922. Mask house 930 performs mask data preparation 932, where IC design layout diagram 922 is translated into a representative data file ("RDF"). Mask data preparation 932 provides the RDF to mask fabrication 934. Mask fabrication 934 includes a mask writer. A mask writer converts the RDF to an image on a substrate, such as a mask (reticle) or a semiconductor wafer. The design layout diagram is manipulated by mask data preparation 932 to comply with particular characteristics of the mask writer and/or requirements of IC fab 940. In FIG. 9, mask data preparation 932 and mask fabrication 934 are illustrated as separate elements. In some embodiments, mask data preparation 932 and mask fabrication 934 can be collectively referred to as mask data preparation.

In some embodiments, mask data preparation 932 includes optical proximity correction (OPC) which uses lithography enhancement techniques to compensate for image errors, such as those that can arise from diffraction, interference, other process effects and the like. OPC adjusts IC design layout diagram 922. In some embodiments, mask data preparation 932 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 932 includes a mask rule checker (MRC) that checks the IC design layout diagram that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram to compensate for limitations during mask fabrication 934, which may undo part of the modifications performed by OPC in order to meet mask creation rules.

In some embodiments, mask data preparation 932 includes lithography process checking (LPC) that simulates processing that will be implemented by IC fab 940 to fabricate IC device 960. LPC simulates this processing based on IC design layout diagram 922 to create a simulated manufactured device, such as IC device 960. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 922.

It should be understood that the above description of mask data preparation 932 has been simplified for the purposes of clarity. In some embodiments, mask data preparation 932 includes additional features such as a logic operation (LOP) to modify the IC design layout diagram according to manufacturing rules. Additionally, the processes applied to IC design layout diagram 922 during mask data preparation 932 may be executed in a variety of different orders.

After mask data preparation 932 and during mask fabrication 934, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by mask fabrication 934 is used in a variety of processes. For example, such a mask(s) is used in an ion implantation process to form various doped regions in the semiconductor wafer, in an etching process to form various etching regions in the semiconductor wafer, and/or in other suitable processes.

IC fab 940 is an IC fabrication business that includes one or more manufacturing facilities for the fabrication of a variety of different IC products. In some embodiments, IC Fab 940 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 940 uses the mask (or masks) fabricated by mask house 930 to fabricate IC device 960. Thus, IC fab 940 at least indirectly uses IC design layout diagram 922 to fabricate IC device 960. In some embodiments, a semiconductor wafer 942 is fabricated by IC fab 940 using the mask (or masks) to form IC device 960. Semiconductor wafer 942 includes a silicon substrate or other proper substrate having material layers formed thereon. Semiconductor wafer further includes one or more of various doped regions, dielectric features, multilevel interconnects, and the like (formed at subsequent manufacturing steps).

Details regarding an integrated circuit (IC) manufacturing system (e.g., system 900 of FIG. 9), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In an embodiment, a logic circuit includes: first and second inverters and transistors configured such that: first and second sets thereof represent corresponding first and second NAND circuits; a third set thereof represents a transmission gate; and a fourth set thereof represents a transmission-gate-substitute (TGS) circuit; and wherein: a first input of each of the first and second NAND circuits is configured to receive corresponding first and second data signals; a second input of each of the first and second NAND circuits is configured to receive an enable signal; the first inverter is configured to receive an output of the first NAND circuit; the third and fourth sets are arranged as a combination circuit, representing one of an exclusive OR (XOR) circuit or an exclusive NOR (XNR) circuit, and being configured to receive an output of the second NAND circuit as a data input, and an output of the first inverter and an output of the second NAND circuit as control inputs; the second inverter is configured to receive an output of the combination circuit; and an output of the second inverter represents one of an enable XOR (EXOR) function or an enable XNR (EXNR) function applied to the first and second data signals and the enable signal.

In an embodiment, each of the first and second inverters includes transistors; and a sum of the transistors in the first and second inverters and the first to fourth sets is fewer than 24. In an embodiment, the sum of the transistors in the first and second inverters and the first to fourth sets is 18. In an embodiment, the fourth set, which represents the TGS circuit, includes first and second PMOS transistors, and first and second NMOS transistors; the first PMOS transistor is connected between a first reference voltage and the second PMOS transistor; the second PMOS transistor is connected between the first PMOS transistor and an output node of the TGS circuit; the first NMOS transistor is connected between the output node of the TGS circuit and the second NMOS transistor; and the second NMOS transistor is connected between the first NMOS transistor and a second reference voltage. In an embodiment, at least one of the following is true: in a first circumstance in which the output of the second inverter represents the EXOR function, a gate electrode of the second PMOS transistor of the TGS circuit is configured to receive the output of the first NAND circuit, and a gate electrode of the first NMOS transistor of the TGS circuit is configured to receive the output of the first inverter; or, in a second circumstance in which the output of the second inverter represents the EXNR function, a gate electrode of the second PMOS transistor of the TGS circuit is configured to receive the output of the first inverter, and a gate electrode of the first NMOS transistor of the TGS circuit is configured to receive the output of the first NAND circuit. In an embodiment, the third set, which represents a transmission gate, is configured to receive the output of the first inverter and the output of the second NAND circuit as first and second control inputs; the fourth set, which represents the TGS circuit, is configured to receive the output of the first inverter and the output of the second NAND circuit as first and second control inputs; a data input of each of the third and fourth sets is configured to receive the output of the second NAND circuit; and a data output of the third set is connected to a data output of the fourth set at a node representing the output of the combination circuit. In an embodiment, a transistor in each of the first and second sets is a power-saving transistor which correspondingly is arranged for selectively operating the corresponding first and second sets in a run-mode or a power-conservation-mode.

In an embodiment, for the first set, excluding the power-saving transistor included therein, remaining ones of the transistors of the transistors are collectively coupled between a first reference voltage and a first node; and also for the first set, the power-saving transistor is coupled between the first node and a second reference voltage; and for the second set, excluding the power-saving transistor included therein, remaining ones of the transistors of the transistors are collectively coupled between the first reference voltage and a second node; and also for the second set, the power-saving transistor is coupled between the second node and a second reference voltage; and a gate terminal of the power-saving transistor in each of the first and second sets is coupled to an enable signal for selectively turning the power-saving transistor on or off. In an embodiment, when the first and second sets operate in the power-conservation-mode, the logic circuit consumed about 98% less power than when the first and second sets operate in the run-mode.

In an embodiment, a logic circuit (for providing an N-bit multibit flip-flop (MBFF) function) includes: a first inverter configured to receive a clock signal and generate a corresponding clock_bar signal; a second inverter configured to receive the clock_bar signal and generate a corresponding clock_bar_bar signal; a third inverter configured to receive a control signal and generate a corresponding control_bar signal; and N instances of a 1-bit transfer flip-flop (TXFF) circuit, N being a positive integer and 2≤N, each ith instance of the TXFF circuit including an ith NAND circuit configured to receive data signals, and an ith 1-bit transmit gate flip-flop (TGFF) circuit configured to output signals Q(i) and q(i), and receive an output of the ith NAND circuit, a signal q(i−1) from an (i−1)th TGFF circuit of an (i−1)th TXFF circuit, the clock_bar signal, the clock_bar_bar signal, the control signal and the control_bar signal; and wherein a zeroth ((0)th) one of the N transfer TXFF circuits is configured to receive a start signal in place of the q(i−1) signal.

In an embodiment, N=8 such that the logic circuit provides an 8-bit FF (FF8); and the logic circuit includes fewer than 264 transistors. In an embodiment, the logic circuit includes 246 or fewer transistors. In an embodiment, each ith instance of the TGFF circuit further includes a transmission gate, first to fourth transmission-gate-substitute (TGS) circuits, and first to third inverters; an input of the first TGS circuit is configured to receive the control_bar signal; an input of the second TGS circuit is connected at a first intermediate node to each of an output of the first TGS circuit and an output of the ith NAND circuit; an output of the second TGS circuit is connected at a second intermediate node to each of an input of the third TGS circuit and an input of the first inverter; each of an output of the third TGS circuit and an output of the first inverter is connected at a third intermediate node to an input of the transmission gate; an output of the transmission gate is connected at a fourth intermediate node to each of an input of the fourth TGS circuit and an input of each of the second and third inverters; an output of the second inverter is connected to a first output node of the ith instance of the TXFF circuit; and an output of each of the fourth TGS circuit and the third inverter are connected to a second output node of the ith instance of the TXFF circuit. In an embodiment, each of the first to fourth TGS circuits includes first and second PMOS transistors, and first and second NMOS transistors; and wherein: the first PMOS transistor is connected between a first reference voltage and the second PMOS transistor; the second PMOS transistor is connected between the first PMOS transistor and an output node of the TGS circuit; the first NMOS transistor is connected between the output node of the TGS circuit and the second NMOS transistor; and the second NMOS transistor is connected between the first NMOS transistor and a second reference voltage.

In an embodiment, a logic circuit includes: first and second inverters; transistors representing corresponding first and second NAND circuits; transistors representing a transmission gate; and transistors representing a transmission-gate-substitute (TGS) circuit; and wherein: a first input of each of the first and second NAND circuits is configured to receive corresponding first and second data signals; a second input of each of the first and second NAND circuits is configured to receive an enable signal; the first inverter is configured to receive an output of the first NAND circuit; the transmission gate and the TGS circuit are arranged as a combination circuit which is configured to receive an output of the second NAND circuit as a data input, and an output of the first inverter and an output of the second NAND circuit as control inputs; the second inverter is configured to receive an output of the combination circuit; and an output of the second inverter represents one of an enable XOR (EXOR) function or an enable XNR (EXNR) function applied to the first and second data signals and the enable signal.

In an embodiment, each of the first and second inverters includes transistors; and a sum of the transistors in the first and second inverters, the first and second NAND circuits, the transmission gate and the TGS circuit is fewer than 24. In an embodiment, the sum of the transistors in the first and second inverters, the first and second NAND circuits, the transmission gate and the TGS circuit is 18. In an embodiment, the TGS circuit includes first and second PMOS transistors, and first and second NMOS transistors; the first PMOS transistor is connected between a first reference voltage and the second PMOS transistor; the second PMOS transistor is connected between the first PMOS transistor and an output node of the TGS circuit; the first NMOS transistor is connected between the output node of the TGS circuit and the second NMOS transistor; the second NMOS transistor is connected between the first NMOS transistor and a second reference voltage; the transmission gate is configured to receive the output of the first inverter and the output of the second NAND circuit as first and second control inputs; the TGS circuit is configured to receive the output of the first inverter and the output of the second NAND circuit as first and second control inputs; a data input of each of the transmission gate and the TGS circuit is configured to receive the output of the second NAND circuit; and a data output of the transmission gate is connected to a data output of the TGS circuit at a node representing the output of the combination circuit. In an embodiment, at least one of the following is true: in a first circumstance in which the output of the second inverter represents the EXOR function, a gate electrode of the second PMOS transistor of the TGS circuit is configured to receive the output of the first NAND circuit, and a gate electrode of the first NMOS transistor of the TGS circuit is configured to receive the output of the first inverter; or, in a second circumstance in which the output of the second inverter represents the EXNR function, a gate electrode of the second PMOS transistor of the TGS circuit is configured to receive the output of the first inverter, and a gate electrode of the first NMOS transistor of the TGS circuit is configured to receive the output of the first NAND circuit. In an embodiment, a transistor in each of the first and second NAND circuits is a power-saving transistor which correspondingly is arranged for selectively operating the corresponding first and second NAND circuits in a run-mode or a power-conservation-mode; for the first NAND circuit, excluding the power-saving transistor included therein, remaining ones of the transistors of the transistors are collectively coupled between a first reference voltage and a first node, and also for the first NAND circuit, the power-saving transistor is coupled between the first node and a second reference voltage; and, for the second NAND circuit, excluding the power-saving transistor included therein, remaining ones of the transistors of the transistors are collectively coupled between the first reference voltage and a second node, and also for the second NAND circuit, the power-saving transistor is coupled between the second node and a second reference voltage; and a gate terminal of the power-saving transistor in each of the first and second NAND circuits is coupled to an enable signal for selectively turning the power-saving transistor on or off.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A logic circuit comprising:
first and second inverters; and
transistors configured such that:
  first and second sets thereof represent corresponding first and second NAND circuits;
  a third set thereof represents a transmission gate; and
  a fourth set thereof represents a transmission-gate-substitute (TGS) circuit; and
wherein:
  a first input of each of the first and second NAND circuits is configured to receive corresponding first and second data signals;
  a second input of each of the first and second NAND circuits is configured to receive an enable signal;
  the first inverter is configured to receive an output of the first NAND circuit;
  the third and fourth sets are arranged as a combination circuit, representing one of an exclusive OR (XOR) circuit or an exclusive NOR (XNR) circuit, and being configured to receive:
    an output of the second NAND circuit as a data input; and
    an output of the first inverter and an output of the second NAND circuit as control inputs;
  the second inverter is configured to receive an output of the combination circuit; and
  an output of the second inverter represents one of an enable XOR (EXOR) function or an enable XNR (EXNR) function applied to the first and second data signals and the enable signal.

2. The logic circuit of claim 1, wherein:
each of the first and second inverters includes corresponding ones of the transistors; and
a sum of the transistors in the first and second inverters and the first to fourth sets is fewer than 24.

3. The logic circuit of claim 2, wherein:
the sum of the transistors in the first and second inverters and the first to fourth sets is 18.

4. The logic circuit of claim 1, wherein:
the fourth set, which represents the TGS circuit, includes:
  first and second PMOS transistors; and
  first and second NMOS transistors;
the first PMOS transistor is connected between a first reference voltage and the second PMOS transistor;
the second PMOS transistor is connected between the first PMOS transistor and an output node of the TGS circuit;
the first NMOS transistor is connected between the output node of the TGS circuit and the second NMOS transistor; and
the second NMOS transistor is connected between the first NMOS transistor and a second reference voltage.

5. The logic circuit of claim 4, wherein at least one of the following is true:
in a first circumstance in which the output of the second inverter represents the EXOR function:
  a gate electrode of the second PMOS transistor of the TGS circuit is configured to receive the output of the first NAND circuit; and
  a gate electrode of the first NMOS transistor of the TGS circuit is configured to receive the output of the first inverter; or
in a second circumstance in which the output of the second inverter represents the EXNR function:
  a gate electrode of the second PMOS transistor of the TGS circuit is configured to receive the output of the first inverter; and
  a gate electrode of the first NMOS transistor of the TGS circuit is configured to receive the output of the first NAND circuit.

6. The logic circuit of claim 4, wherein:
the third set, which represents a transmission gate, is configured to receive the output of the first inverter and the output of the second NAND circuit as first and second control inputs;
the fourth set, which represents the TGS circuit, is configured to receive the output of the first inverter and the output of the second NAND circuit as first and second control inputs;
a data input of each of the third and fourth sets is configured to receive the output of the second NAND circuit; and
a data output of the third set is connected to a data output of the fourth set at a node representing the output of the combination circuit.

7. The logic circuit of claim 1, wherein:
a transistor in each of the first and second sets is a power-saving transistor which correspondingly is arranged for selectively operating the corresponding first and second sets in a run-mode or a power-conservation-mode.

8. The logic circuit of claim 7, wherein:
for the first set:
  excluding the power-saving transistor included therein, remaining ones of the transistors are collectively coupled between a first reference voltage and a first node;
  the power-saving transistor is coupled between the first node and a second reference voltage; and
for the second set:
  excluding the power-saving transistor included therein, remaining ones of the transistors are collectively coupled between the first reference voltage and a second node;
  the power-saving transistor is coupled between the second node and a second reference voltage; and
a gate terminal of the power-saving transistor in each of the first and second sets is coupled to an enable signal for selectively turning the power-saving transistor on or off.

9. The logic circuit of claim 7, wherein:
when the first and second sets operate in the power-conservation-mode, the logic circuit consumes about 98% less power than when the first and second sets operate in the run-mode.

10. A logic circuit comprising:
first and second inverters;
transistors representing corresponding first and second NAND circuits;
transistors representing a transmission gate; and
transistors representing a transmission-gate-substitute (TGS) circuit; and
wherein:
  a first input of each of the first and second NAND circuits is configured to receive corresponding first and second data signals;
  a second input of each of the first and second NAND circuits is configured to receive an enable signal;
  the first inverter is configured to receive an output of the first NAND circuit;

the transmission gate and the TGS circuit are arranged as a combination circuit which is configured to receive:
an output of the second NAND circuit as a data input; and
an output of the first inverter and an output of the second NAND circuit as control inputs;
the second inverter is configured to receive an output of the combination circuit; and
an output of the second inverter represents one of an enable XOR (EXOR) function or an enable XNR (EXNR) function applied to the first and second data signals and the enable signal.

11. The logic circuit of claim 10, wherein:
each of the first and second inverters includes transistors; and
a sum of the transistors in the first and second inverters, the first and second NAND circuits, the transmission gate and the TGS circuit is fewer than 24.

12. The logic circuit of claim 11, wherein:
the sum of the transistors in the first and second inverters, the first and second NAND circuits, the transmission gate and the TGS circuit is 18.

13. The logic circuit of claim 10, wherein:
the TGS circuit includes:
first and second PMOS transistors; and
first and second NMOS transistors;
the first PMOS transistor is connected between a first reference voltage and the second PMOS transistor;
the second PMOS transistor is connected between the first PMOS transistor and an output node of the TGS circuit;
the first NMOS transistor is connected between the output node of the TGS circuit and the second NMOS transistor;
the second NMOS transistor is connected between the first NMOS transistor and a second reference voltage;
the transmission gate is configured to receive the output of the first inverter and the output of the second NAND circuit as first and second control inputs;
the TGS circuit is configured to receive the output of the first inverter and the output of the second NAND circuit as first and second control inputs;
a data input of each of the transmission gate and the TGS circuit is configured to receive the output of the second NAND circuit; and
a data output of the transmission gate is connected to a data output of the TGS circuit at a node representing the output of the combination circuit.

14. The logic circuit of claim 13, wherein at least one of the following is true:
in a first circumstance in which the output of the second inverter represents the EXOR function:
a gate electrode of the second PMOS transistor of the TGS circuit is configured to receive the output of the first NAND circuit; and
a gate electrode of the first NMOS transistor of the TGS circuit is configured to receive the output of the first inverter; or
in a second circumstance in which the output of the second inverter represents the EXNR function:
a gate electrode of the second PMOS transistor of the TGS circuit is configured to receive the output of the first inverter; and
a gate electrode of the first NMOS transistor of the TGS circuit is configured to receive the output of the first NAND circuit.

15. The logic circuit of claim 10, wherein:
a transistor in each of the first and second NAND circuits is a power-saving transistor which correspondingly is arranged for selectively operating the corresponding first and second NAND circuits in a run-mode or a power-conservation-mode;
for the first NAND circuit:
excluding the power-saving transistor included therein, remaining ones of the transistors are collectively coupled between a first reference voltage and a first node;
the power-saving transistor is coupled between the first node and a second reference voltage; and
for the second NAND circuit:
excluding the power-saving transistor included therein, remaining ones of the transistors are collectively coupled between the first reference voltage and a second node;
the power-saving transistor is coupled between the second node and a second reference voltage; and
a gate terminal of the power-saving transistor in each of the first and second NAND circuits is coupled to an enable signal for selectively turning the power-saving transistor on or off.

16. A logic circuit comprising:
first and second inverters;
transistors representing corresponding first and second NAND circuits,
a transistor in each of the first and second NAND circuits being a power-saving transistor which correspondingly is arranged for selectively operating the corresponding first and second NANDs in a run-mode or a power-conservation-mode;
transistors representing a transmission gate; and
transistors representing a transmission-gate-substitute (TGS) circuit; and
wherein:
a first input of each of the first and second NAND circuits is configured to receive corresponding first and second data signals;
a second input of each of the first and second NAND circuits is configured to receive an enable signal;
the first inverter is configured to receive an output of the first NAND circuit;
the transmission gate and the TGS circuit are arranged as a combination circuit which is configured to receive:
an output of the second NAND circuit as a data input; and
an output of the first inverter and an output of the second NAND circuit as control inputs;
the second inverter is configured to receive an output of the combination circuit; and
an output of the second inverter represents one of an enable XOR (EXOR) function or an enable XNR (EXNR) function applied to the first and second data signals and the enable signal.

17. The logic circuit of claim 16, wherein:
for the first NAND:
excluding the power-saving transistor included therein, remaining ones are collectively coupled between a first reference voltage and a first node;
the power-saving transistor is coupled between the first node and a second reference voltage; and for the second NAND:
  excluding the power-saving transistor included therein, remaining ones of the transistors are collectively coupled between the first reference voltage and a second node;
  the power-saving transistor is coupled between the second node and a second reference voltage; and
a gate terminal of the power-saving transistor in each of the first and second sets is coupled to an enable signal for selectively turning the power-saving transistor on or off.

18. The logic circuit of claim 16, wherein:
when the first and second NANDs operate in the power-conservation-mode, the logic circuit consumes about 98% less power than when the first and second NANDs operate in the run-mode.

19. The logic circuit of claim 10, wherein:
the TGS circuit includes:
  first and second PMOS transistors; and
  first and second NMOS transistors;
the first PMOS transistor is connected between a first reference voltage and the second PMOS transistor;
the second PMOS transistor is connected between the first PMOS transistor and an output node of the TGS circuit;
the first NMOS transistor is connected between the output node of the TGS circuit and the second NMOS transistor;
the second NMOS transistor is connected between the first NMOS transistor and a second reference voltage;
the transmission gate is configured to receive the output of the first inverter and the output of the second NAND circuit as first and second control inputs;
the TGS circuit is configured to receive the output of the first inverter and the output of the second NAND circuit as first and second control inputs;
a data input of each of the transmission gate and the TGS circuit is configured to receive the output of the second NAND circuit; and
a data output of the transmission gate is connected to a data output of the TGS circuit at a node representing the output of the combination circuit.

20. The logic circuit of claim 13, wherein at least one of the following is true:
in a first circumstance in which the output of the second inverter represents the EXOR function:
  a gate electrode of the second PMOS transistor of the TGS circuit is configured to receive the output of the first NAND circuit; and
  a gate electrode of the first NMOS transistor of the TGS circuit is configured to receive the output of the first inverter; or
in a second circumstance in which the output of the second inverter represents the EXNR function:
  a gate electrode of the second PMOS transistor of the TGS circuit is configured to receive the output of the first inverter; and
  a gate electrode of the first NMOS transistor of the TGS circuit is configured to receive the output of the first NAND circuit.

* * * * *